(12) United States Patent
Nakanishi et al.

(10) Patent No.: US 11,522,646 B2
(45) Date of Patent: Dec. 6, 2022

(54) ELECTRONIC APPARATUS AND METHOD

(71) Applicant: KABUSHIKI KAISHA TOSHIBA, Tokyo (JP)

(72) Inventors: Kensuke Nakanishi, Tokyo (JP); Masahiro Sekiya, Tokyo (JP); Toshihisa Nabetani, Kawasaki Kanagawa (JP); Narendar Madhavan, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/556,276

(22) Filed: Aug. 30, 2019

(65) Prior Publication Data
US 2020/0119863 A1    Apr. 16, 2020

(30) Foreign Application Priority Data

Oct. 11, 2018    (JP) .............................. JP2018-192595

(51) Int. Cl.
*H04L 1/22*    (2006.01)
*H04L 5/00*    (2006.01)

(52) U.S. Cl.
CPC .............. *H04L 1/22* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 5,168,502 A | 12/1992 | Millet | |
| 2005/0185621 A1* | 8/2005 | Sivakumar | H04L 47/27 370/335 |
| 2007/0195701 A1* | 8/2007 | Menth | H04L 45/24 370/238 |

(Continued)

FOREIGN PATENT DOCUMENTS

| | | |
|---|---|---|
| JP | H02280432 A | 11/1990 |
| JP | 2000183856 A | 6/2000 |

(Continued)

OTHER PUBLICATIONS

Andrew, et al., "User Cooperation Diversity—Part I: System Description", IEEE Transactions on Communications, Nov. 2003, vol. 51, No. 11, pp. 1927-1938.

(Continued)

*Primary Examiner* — Christopher T Wyllie
(74) *Attorney, Agent, or Firm* — Holtz, Holtz & Volek PC

(57) ABSTRACT

According to one embodiment, an electronic apparatus includes a transmitter circuitry, a receiver circuitry, and a processing circuitry. The transmitter circuitry transmits a first data frame including first data to a destination apparatus. The receiver circuitry receives first acknowledgment information indicative of a reception state of the first data included in the first data frame. The receiver circuitry receives second acknowledgment information indicative of a reception state of the first data included in a second data frame. The second data frame is transmitted from another electronic apparatus to the destination apparatus. The processing circuitry determines whether the first data frame is retransmitted, based on at least one of the first and second acknowledgment information.

21 Claims, 12 Drawing Sheets

(56) References Cited

U.S. PATENT DOCUMENTS

| | | | |
|---|---|---|---|
| 2008/0031177 A1* | 2/2008 | Lee | H04L 1/0002 370/312 |
| 2008/0219222 A1 | 9/2008 | Lo et al. | |
| 2009/0201899 A1* | 8/2009 | Liu | H04W 40/02 370/338 |
| 2009/0232053 A1* | 9/2009 | Taki | H04L 1/1685 370/328 |
| 2010/0131672 A1* | 5/2010 | Karaoguz | H04L 45/308 709/238 |
| 2011/0093758 A1* | 4/2011 | Etkin | H04L 1/0057 714/751 |
| 2011/0124346 A1 | 5/2011 | Kobayashi | |
| 2011/0125921 A1* | 5/2011 | Karenos | H04L 45/00 709/240 |
| 2014/0169173 A1* | 6/2014 | Naouri | H04L 47/122 370/237 |
| 2014/0181298 A1* | 6/2014 | Wang | H04L 43/04 709/224 |
| 2014/0185458 A1* | 7/2014 | Yoo | H04W 24/08 370/242 |
| 2014/0201587 A1* | 7/2014 | Luby | H04L 1/22 714/751 |
| 2017/0164263 A1* | 6/2017 | Lindoff | H04L 45/121 |
| 2017/0188390 A1* | 6/2017 | Adachi | H04L 1/008 |
| 2018/0139679 A1* | 5/2018 | Åström | H04W 48/16 |
| 2018/0234473 A1* | 8/2018 | Levi | H04L 65/61 |
| 2020/0112363 A1* | 4/2020 | Roy | H04L 45/24 |
| 2020/0334195 A1* | 10/2020 | Chen | H04L 47/34 |

FOREIGN PATENT DOCUMENTS

| | | |
|---|---|---|
| JP | 2003037537 A | 2/2003 |
| JP | 2003069620 A | 3/2003 |
| JP | 2010521095 A | 6/2010 |
| JP | 2011114481 A | 6/2011 |
| JP | 5310505 B2 | 7/2013 |
| JP | 2013168694 A | 8/2013 |
| JP | 2017121037 A | 7/2017 |

OTHER PUBLICATIONS

Dulman, et al., "Trade-Off between Traffic Overhead and Reliability in Multipath Routing for Wireless Sensor Networks", 2003 IEEE Wireless Communications and Networking (WCNC 2003), 2003, pp. 1918-1922.

* cited by examiner

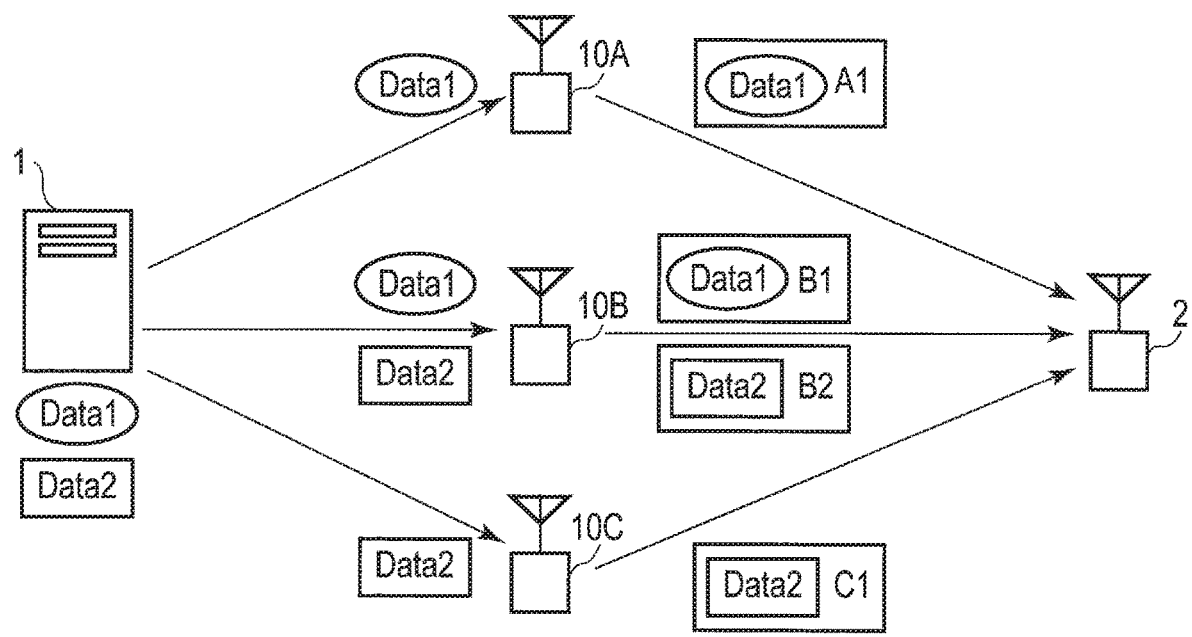
F I G. 11
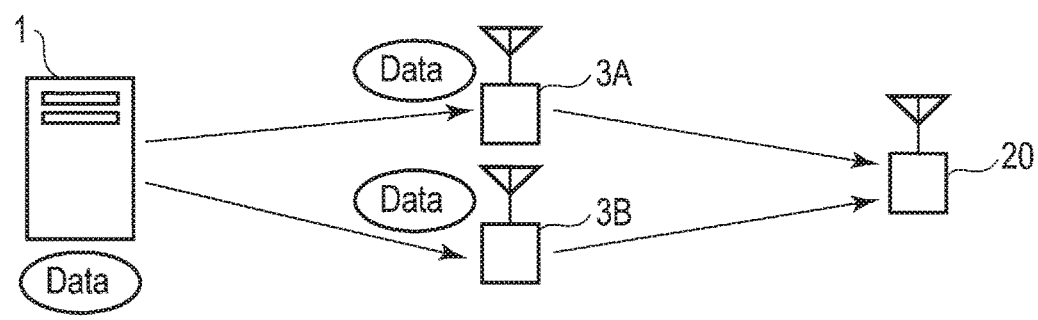
F I G. 12

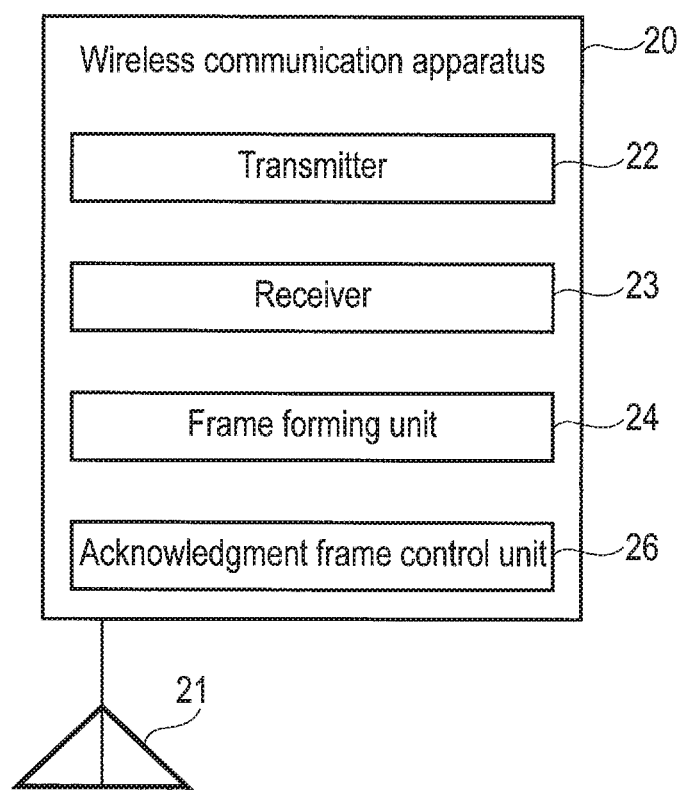
F I G. 13

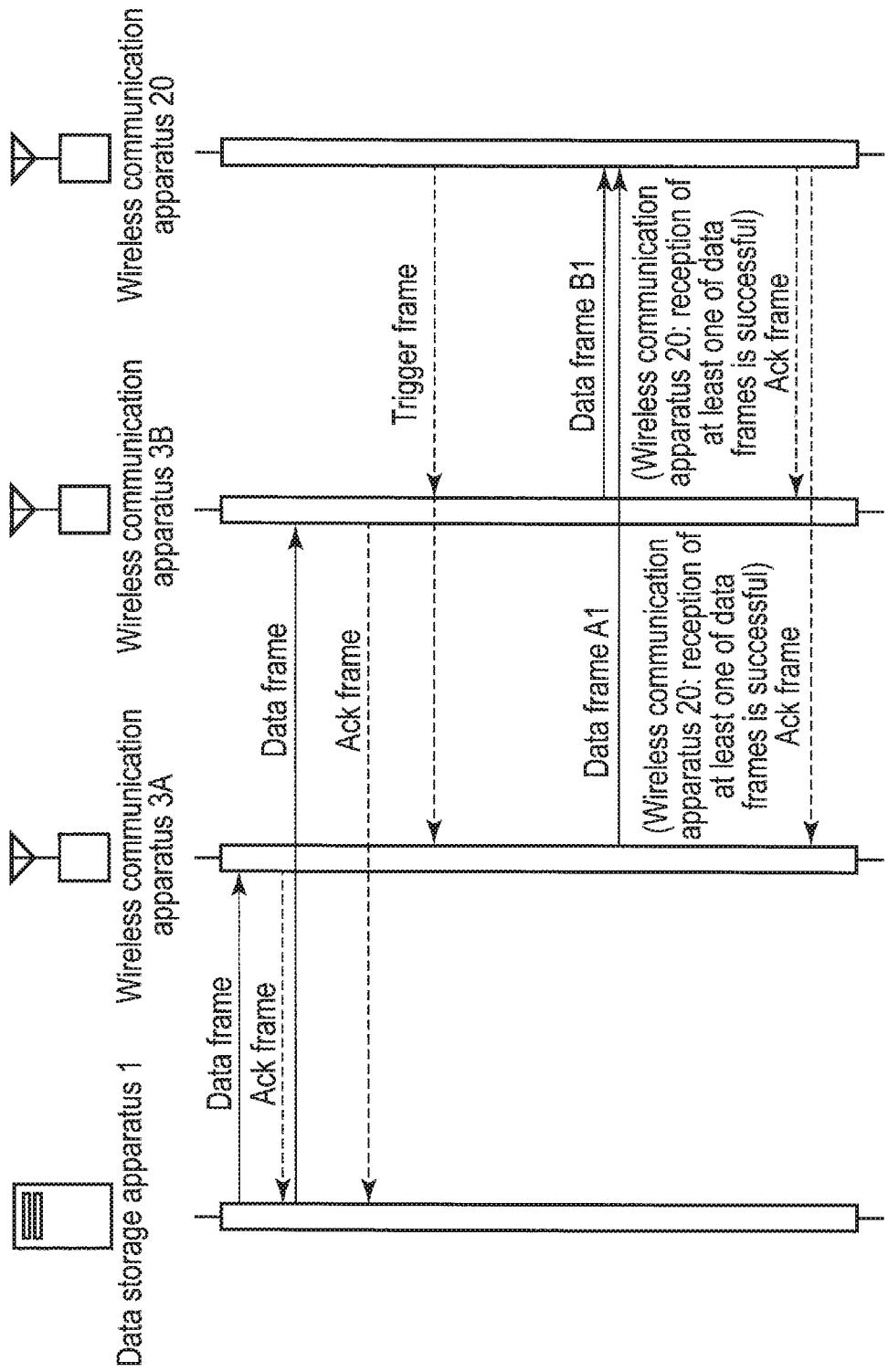
F I G. 14

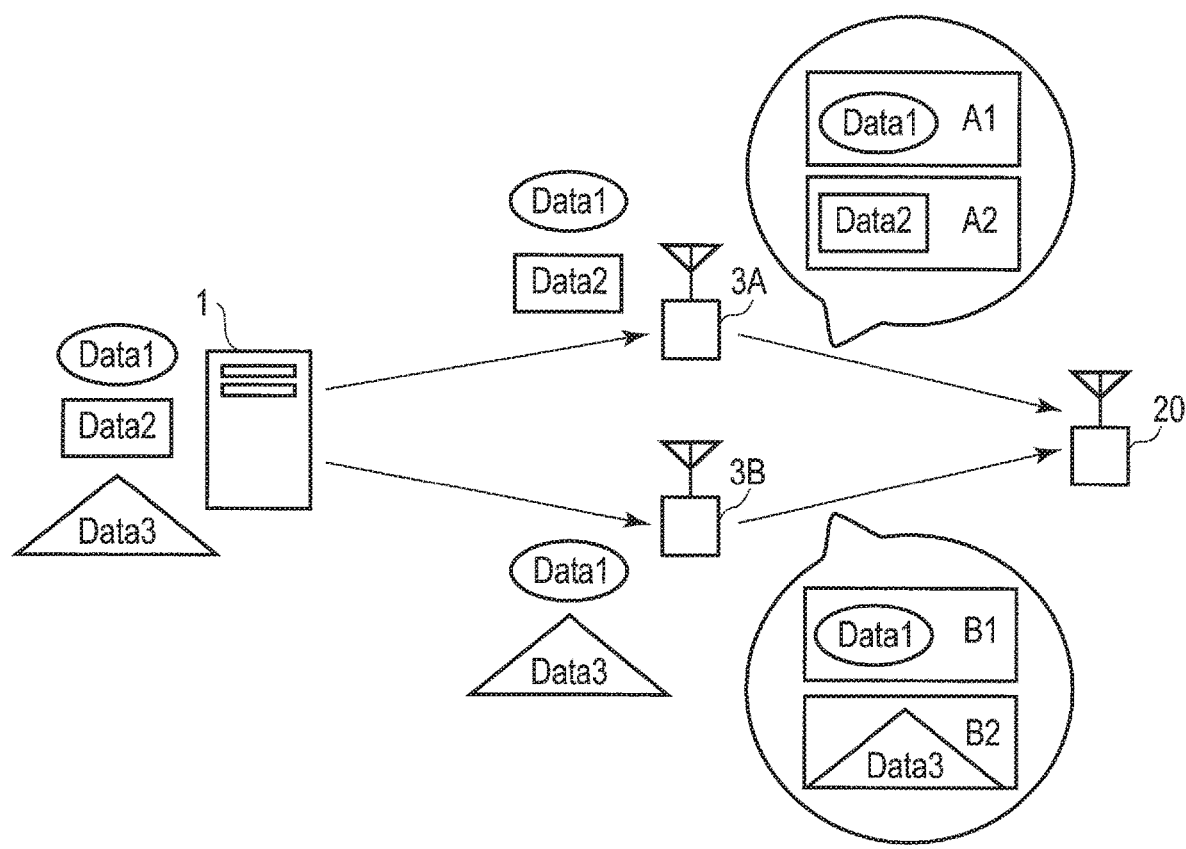
F I G. 16

ELECTRONIC APPARATUS AND METHOD

CROSS-REFERENCE TO RELATED APPLICATIONS

This application is based upon and claims the benefit of priority from Japanese Patent Application No. 2018-192595, filed Oct. 11, 2018, the entire contents of which are incorporated herein by reference.

FIELD

Embodiments described herein relate generally to an electronic apparatus and method.

BACKGROUND

Wireless communication apparatuses employing route diversity and site diversity technologies that enhance reliability of wireless communication by transmitting the same data from multiple base stations are known. Wireless communication apparatuses and methods capable of reducing a redundant time for which wireless communication channels are occupied while enhancing the reliability of the wireless communication have been desired.

BRIEF DESCRIPTION OF THE DRAWINGS

FIG. 11 is a diagram illustrating a system in a case where two pieces of data, which are different each other, are transmitted in the first embodiment.

FIG. 12 is a diagram illustrating a system including an electronic apparatus according to a second embodiment.

FIG. 13 is a diagram illustrating a configuration of the electronic apparatus of the second embodiment.

FIG. 14 is a diagram illustrating a sequence in a wireless communication system of the second embodiment.

FIG. 16 is a diagram illustrating a wireless communication system in a case where pieces of data, which are the same, and pieces of data, which are different each other, are transmitted in the second embodiment.

DETAILED DESCRIPTION

Various embodiments will be described hereinafter with reference to the accompanying drawings.

In general, according to one embodiment, an electronic apparatus includes transmitter circuitry, receiver circuitry, and processing circuitry. The transmitter circuitry is configured to transmit a first data frame including first data to a destination apparatus. The receiver circuitry is configured to receive first acknowledgment information from the destination apparatus, wherein the first acknowledgment information indicates a reception state of the first data included in the first data frame. The receiver circuitry is configured to receive second acknowledgment information from the destination apparatus, wherein the second acknowledgment information indicates a reception state of the first data included in a second data frame, and the second data frame is transmitted from another electronic apparatus to the destination apparatus. The processing circuitry is configured to determine whether the first data frame is retransmitted, based on at least one of the first acknowledgment information and the second acknowledgment information.

First Embodiment

Figure 1:
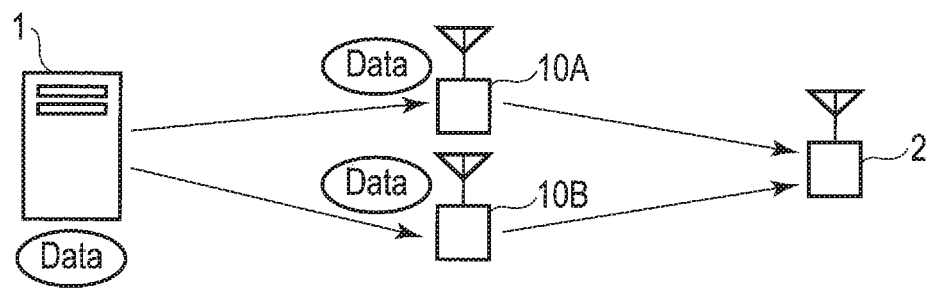
FIG. 1 is a diagram illustrating a system including an electronic apparatus (for example, a wireless communication apparatus) according to a first embodiment.

FIG. 1 is a diagram illustrating a wireless communication system including a wireless communication apparatus according to a first embodiment. The wireless communication system of the present embodiment includes a data storage apparatus (1 in FIG. 1), one or more wireless communication apparatuses on the data transmission side (two wireless communication apparatuses 10A and 10B in FIG. 1), and a wireless communication apparatus on the data reception side (2 in FIG. 1). The wireless communication apparatuses on the data transmission side are wireless communication apparatuses that transmit data, which is received from the data storage apparatus 1, to the wireless communication apparatus 2, and correspond to the wireless communication apparatuses 10A and 10B as shown in FIG. 1. The wireless communication apparatus on the data reception side is a wireless communication apparatus that receives data, which is acquired from the data storage apparatus 1, from the wireless communication apparatuses 10A and 10B, and corresponds to the wireless communication apparatus 2 as shown in FIG. 1.

The data storage apparatus 1 and the wireless communication apparatus 10A, and the data storage apparatus 1 and the wireless communication apparatus 10B are connected to perform wired or wireless communication. The data storage apparatus 1 and the wireless communication apparatus 10A, and the data storage apparatus 1 and the wireless communication apparatus 10B may be connected to perform communication via a router or the like. In addition, the wireless communication apparatuses 10A and 10B are connected to the wireless communication apparatus 2 to perform wireless communication. The data storage apparatus 1 is an electronic apparatus that stores data to be delivered to the wireless communication apparatus 2. The data storage apparatus 1 is, for example, a storage unit (such as a RAM, a ROM, an HDD, or an SSD) in a server.

The summary of the present embodiment will be explained with reference to the system diagram of FIG. 1. The wireless communication apparatuses 10A and 10B receive the same data from the data storage apparatus 1 and transmit data frames including the data to the wireless communication apparatus 2. The wireless communication apparatus 2 receives the data frames and verify that each of the data frames is received without an error. If the data frame received from either of the wireless communication apparatuses 10A and 10B includes an error but the data frame is received from the other wireless communication apparatus without an error, the data is delivered to the wireless communication apparatus 2. After that, the wireless communication apparatus 2 transmits an acknowledgment frame to the wireless communication apparatus that is the sender apparatus of the data frame which the wireless communication apparatus 2 has succeeded in receiving. The acknowledgment frame is a frame indicating that the data has been received without an error. If the wireless communication apparatuses 10A and 10B determine that the wireless communication apparatus 2 has received the data frame without an error based on the acknowledgment frame, the wireless communication apparatuses 10A and 10B determine that the data frame is not retransmitted. Note that the acknowledgement frame may include one or more pieces of acknowledgement information. Each piece of acknowledgement information indicates that a data frame, which has been transmitted by a sender apparatus (e.g., the wireless communication apparatuses 10A or 10B), has been received without an error by the wireless communication apparatus 2.

A case where the wireless communication apparatus 2 has received a data frame with an error means that the reception is unsuccessful or a failure of reception occurs. A case where the wireless communication apparatus 2 has not received a data frame also means that the reception is unsuccessful or a failure of reception occurs. A case where the wireless communication apparatus 2 has received a data frame without an error means that the reception is successful or a success of reception occurs.

If the wireless communication apparatus 2 fails in reception of a data frame, the wireless communication apparatus 2 does not transmit an acknowledgment frame to the wireless communication apparatus on the data transmission side that has transmitted the data frame. If the wireless communication apparatus 2 succeeds in reception of a data frame, the wireless communication apparatus 2 transmits an acknowledgment frame to the wireless communication apparatus on the data transmission side that has transmitted the data frame.

In the present embodiment, a frame for a wireless LAN system under IEEE802.11 standard is used. IEEE802.11 standard includes IEEE802.11 standard to be defined in future, in addition to IEEE 802.11a, IEEE 802.11b, IEEE 802.11g, IEEE 802.11n, IEEE 802.11ac, IEEE 802.11ax, and the like.

Figure 2:
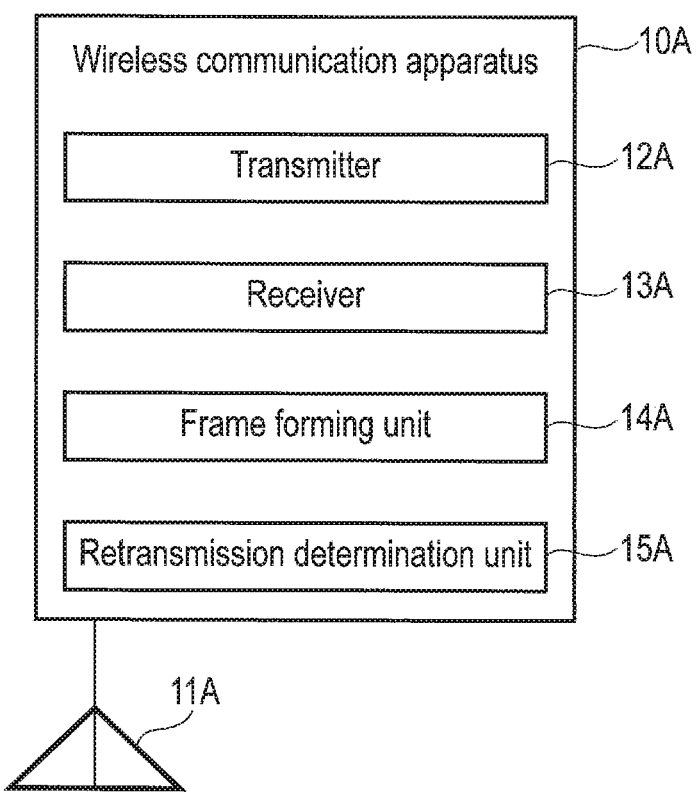
FIG. 2 is a diagram illustrating a configuration of the electronic apparatus of the first embodiment.

FIG. 2 illustrates a configuration example of the wireless communication apparatus 10A of the first embodiment. The wireless communication apparatus 10A includes an antenna 11A for transmission and reception, a transmitter 12A that transmits a frame via the antenna 11A, a receiver 13A that receives a frame transmitted from at least one wireless communication apparatus via the antenna 11A, a frame forming unit 14A that forms a frame to be transmitted, and a retransmission determination unit 15A that determines whether a data frame is to be retransmitted. This configuration is implemented by a semiconductor integrated circuit (an LSI or the like). Similarly, the wireless communication apparatus 10B explained with reference to FIG. 1 includes an antenna 11B, a transmitter 123, a receiver 13B, a frame forming unit 14B, and a retransmission determination unit 15B and is implemented by a semiconductor integrated circuit.

The transmitter 12A transmits a frame via the antenna 11A. The transmitter 12A may transmit a frame for a wireless LAN system under IEEE802.11 standard such as a trigger frame, a data frame, an acknowledgment frame, and a management frame. At this time, the transmitter 12A may transmit a frame in parallel with another frame transmitted from another wireless communication apparatus (for example, the wireless communication apparatus 10B in the present embodiment) by multiplexing the frame and the other frame into the multiplexed frames.

The frame multiplexing by the transmitters 12A and 12B may be implemented using frequency-division multiplexing of transmitting frames with respectively different frequency bandwidths, space-division multiplexing of transmitting frames with multiple antennas, and orthogonal frequency-division multiplexing of transmitting frames with respectively different sub-carriers.

The receiver 13A receives a frame transmitted from at least one wireless communication apparatus via the antenna 11A. The receiver 13A may receive a frame for a wireless LAN system under IEEE802.11 standard such as a trigger frame, a data frame, an acknowledgment frame, and a management frame. The receiver 13A may receive multiplexed frames and demultiplex the multiplexes frames into frames before the multiplexing. The receiver 13A verifies whether the received frame includes no error (i.e., whether the reception is successful). If the reception is successful, the receiver 13A instructs the frame forming unit 14A to form an acknowledgment frame for the wireless communication apparatus which has transmitted this frame. In addition, the receiver 13A may also receive a radio wave of a frame which is not transmitted to the own apparatus and restore the radio wave to the frame.

The frame forming unit 14A forms a frame used for communication and instructs the transmitter 12A to transmit this frame. The frame forming unit 14A may form a frame for a wireless LAN system under IEEE802.11 standard such as a trigger frame, a data frame, an acknowledgment frame, and a management frame. In the present embodiment, a trigger frame, a data frame, and an acknowledgment frame are used. A MAC frame is used as the data frame, and an Ack frame or a Block Ack frame is used as the acknowledgment frame. Each of the frames will be described later in detail.

The retransmission determination unit 15A determines whether a data frame including data, which has already been transmitted, is retransmitted, based on the acknowledgment frame transmitted from the wireless communication apparatus 2. In the present embodiment, in a case where destinations of the acknowledgment frame transmitted from the wireless communication apparatus 2 include at least one of the wireless communication apparatuses 10A and 10B, the retransmission determination unit 15A determines that a data frame including data, which has already transmitted to the wireless communication apparatus 2, is not retransmitted. In contrast, in a case where destinations of the acknowledgment frame include neither the wireless communication apparatuses 10A nor 10B or the acknowledgment frame has not been received, the retransmission determination unit 15A determines that a data frame including the data is retransmitted to the wireless communication apparatus 2.

The wireless communication apparatus 2 has components similar to those of the wireless communication apparatus 10A except for the retransmission determination unit 15A. That is, the wireless communication apparatus 2 includes an antenna 11 for transmission and reception, a transmitter 12 that transmits a frame via the antenna 11, a receiver 13 that receives a frame transmitted from at least one wireless communication apparatus via the antenna 11, and a frame forming unit 14 that forms a frame to be transmitted. These components are the same as those of the wireless communication apparatus 10A and their detailed descriptions will be omitted.

Figure 3:
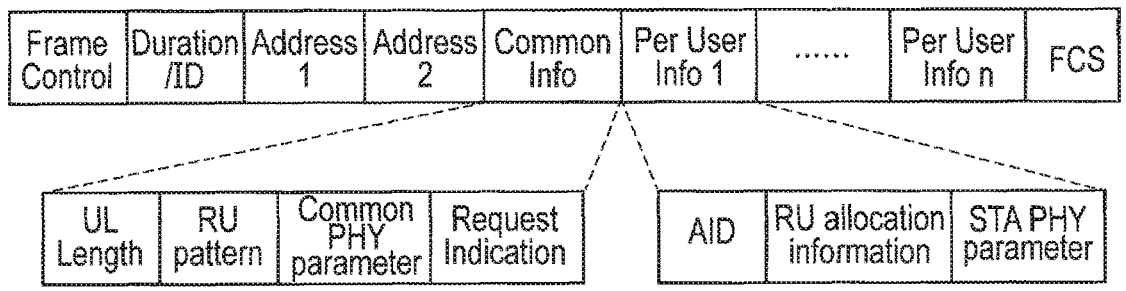
FIG. 3 is a diagram illustrating a format of a trigger frame of the first embodiment.

FIG. 3 illustrates a format of a trigger frame used in the first embodiment. The trigger frame is a frame that a wireless communication apparatus on the data reception side transmits to one or more wireless communication apparatuses on the data transmission side. The trigger frame includes a command for the wireless communication apparatus on the data transmission side to transmit data. In addition, the trigger frame may designate settings of the wireless communication apparatus on the data transmission side to transmit a data frame. The settings include a transmission time of the data frame, a frequency bandwidth used for the transmission, codes used for the transmission, and the like. In the present embodiment, the trigger frame is transmitted to the wireless communication apparatuses 10A and 10B from the wireless communication apparatus 2.

A Frame Control field includes Type and Subtype subfields (both not shown). The wireless communication apparatuses 10A and 10B recognize receiving a trigger frame by using the Type and Subtype subfields.

An Address 1 field indicates one or more wireless communication apparatuses that are the one or more destinations of the trigger frame. In the present embodiment, for example, since the destinations are the wireless communication apparatuses 10A and 10B, the field indicates that the trigger frame is transmitted to the wireless communication apparatuses 10A and 10B.

An Address 2 field indicates a wireless communication apparatus that is the sender of the trigger frame. In the present embodiment, for example, since the sender is the wireless communication apparatus 2, the field indicates that the wireless communication apparatus 2 transmits the trigger frame.

In a Common Info field, information of which multiple wireless communication apparatuses performing data frame transmission are commonly notified is set. In the present embodiment, information of which the wireless communication apparatuses 10A and 10B are commonly notified is set. The Common Info field includes a UL Length field, an RU pattern field, a Common PHY parameter field, and a Request Indication field, as illustrated in FIG. 3.

The UL Length field includes transmission time periods (for example, time periods in a unit of microseconds (μs) or time periods in a unit of 16 μs) for which the wireless communication apparatuses, which are indicated in the Address 1 field, transmit the data frames. Alternatively, the UL Length field may include information that enables the transmission time periods to be calculated (for example, the number of bytes). Therefore, in a case where the Address 1 field indicates multiple wireless communication apparatuses, the ends of the data frames, which are transmitted from the wireless communication apparatuses, respectively, can be aligned and the data frames can be transmitted in parallel.

Figure 4:
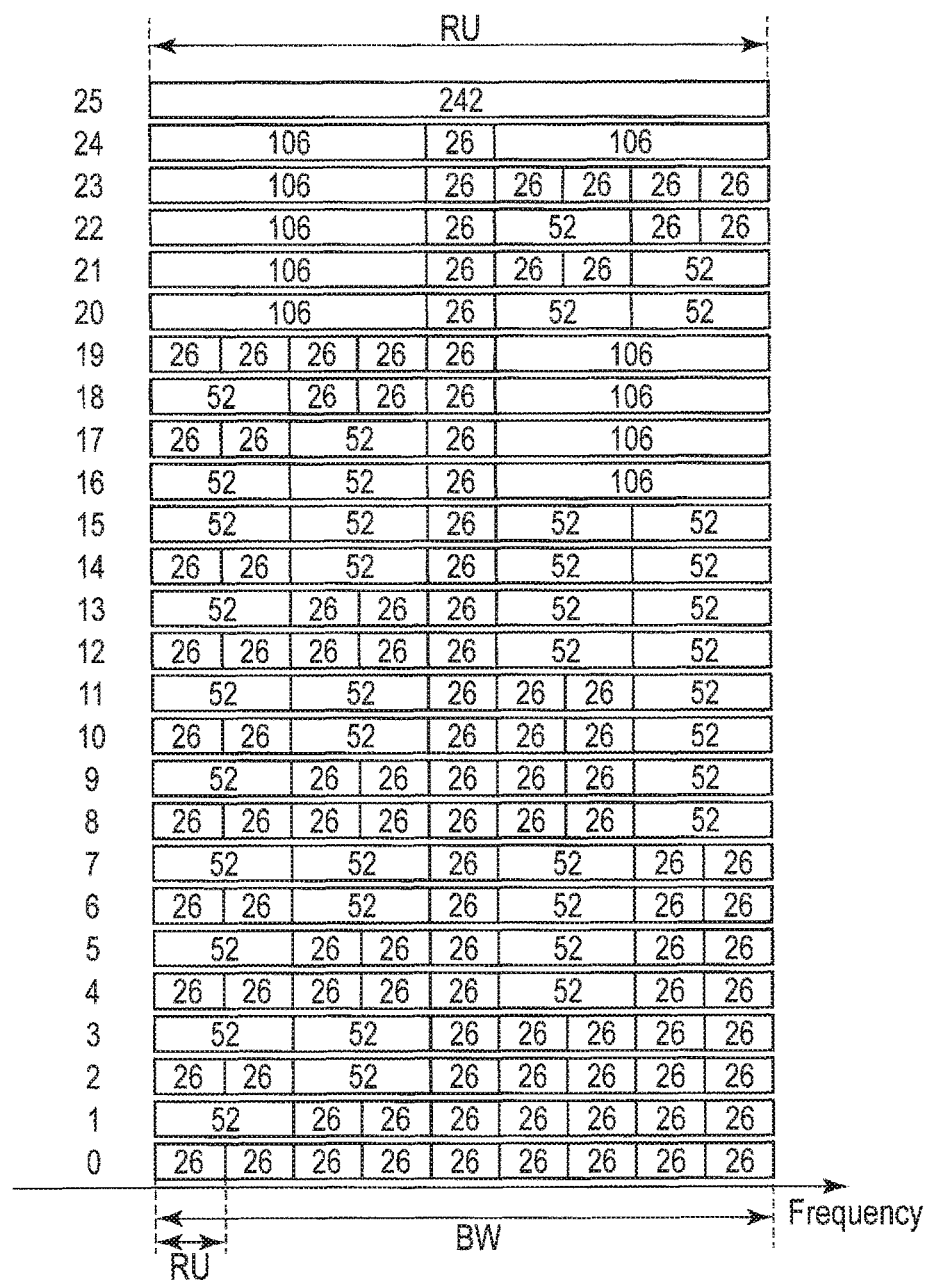
FIG. 4 is a diagram illustrating a pattern of one or more resource units (RUs) of the first embodiment.

The RU pattern field is required, in a case where the Address 1 field indicates multiple wireless communication apparatuses and each of the wireless communication apparatuses performs orthogonal frequency-division multiplexing. FIG. 4 illustrates an example of RU patterns. The frequency bandwidth (BW in FIG. 4) used for the transmission includes multiple sub-carriers (242 sub-carriers in FIG. 4). In the orthogonal frequency-division multiplexing, a certain number of sub-carriers are defined as one RU, and one or more RUs are allocated to each wireless communication apparatus to perform the transmission.

In FIG. 4, as the number of sub-carriers included in an RU, there are four types, i.e., 26, 52, 106, and 242, and 26 sets of RUs included in the BW are defined. The RU patterns (0 to 25 RU patterns in FIG. 4) indicate the arrangements of one or more RUs in the BW, respectively. An RU allocation information, which is described later, designates which RU (or RUs) in one of the arrangements is to be used. Multiple wireless communication apparatuses can thereby transmit data in parallel in the same frequency bandwidth. FIG. 4 illustrates a mere example, and the number of sub-carriers included in a BW, variation of the number of sub-carriers included in an RU, and the arrangement of RUs in a BW are not limited to this drawing.

The descriptions return to FIG. 3. The Common PHY parameter field includes a parameter used in a PHY layer to set the same parameter to the multiple wireless communication apparatuses. An example of the parameter in the present embodiment includes information indicative of the frequency bandwidth (20 MHz width or 80 MHz width) used for the transmission by the wireless communication apparatuses 10A and 10B, and length information of Guard Interval of PHY payload. Frequency-division multiplexing can be performed by making the frequency bandwidths different in the wireless communication apparatuses.

The Request Indication field indicates a request for an operation to be performed by the wireless communication apparatus that is designated in the Address 1 field. The request for an operation of the wireless communication apparatus includes a request for an operation of transmitting data, a request for an operation of transmitting an acknowledgment frame such as an Ack or a Block Ack, a request for an operation of reporting the amount of data of transmission standby stored in the wireless communication apparatus, and a request for an operation of specifying that any type of a frame may be transmitted (i.e., the wireless communication apparatus receiving the trigger frame may select a type of frame to be transmitted).

In a Per User Info field, inherent information of the wireless communication apparatus, which is indicated in the Address 2 field, is included. For example, an AID (an Association ID) field, an RU allocation information field, and an STA PHY parameter field are included as illustrated in FIG. 3.

As described above in relation to the RU pattern field, the RU allocation information field indicates one or more RUs that are included in the arrangement of RUs, which is designated in the RU pattern field, and are used by the wireless communication apparatus that is indicated in the Address 1 field.

The STA PHY parameter field includes one or more parameters used in the inherent PHY layer in a case where the wireless communication apparatus, which is indicated in the Address 2 field, performs transmission with Uplink Orthogonal Frequency Division Multiple Access (UL-OFDMA).

The parameters include PHY transmission speed information such as the number of streams (Nsts: number of space time streams) and a Modulation and Coding Scheme (MCS) Index indicative of the transmission speed to transmit data, and the type of an error-correction code (Low Density Parity Check (LDPC), etc.) that is applied, transmit power information, and the like. In addition, in a case where signals are received from multiple wireless communication apparatuses, the transmission power may also be designated to each of the wireless communication apparatuses to control the signal power from each wireless communication apparatus to the same level.

Figure 5:
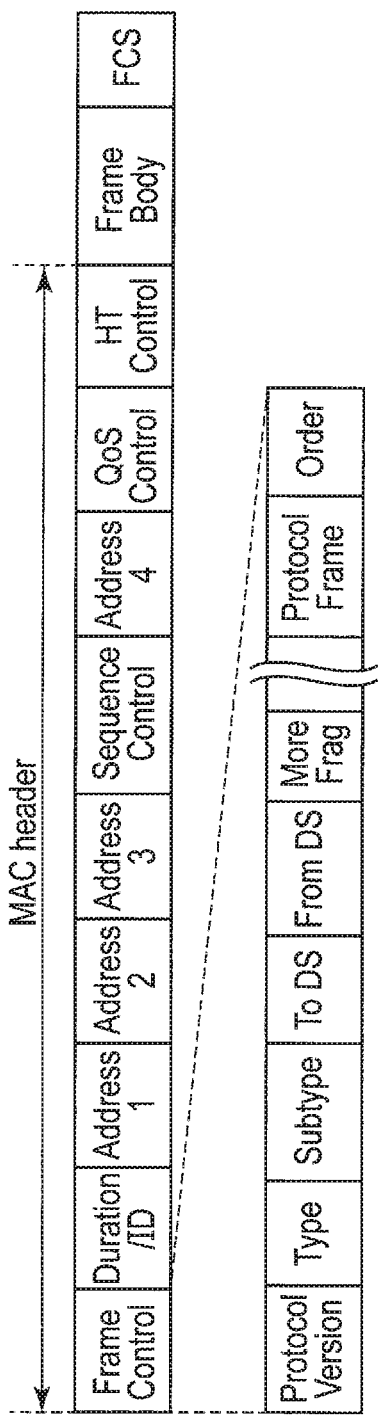
FIG. 5 is a diagram illustrating a format of a MAC frame of the first embodiment.

Next, a MAC frame will be described. FIG. 5 illustrates a format of a MAC frame in the wireless LAN system under IEEE802.11 standard. In the present embodiment, a data frame transmitted from each of the wireless communication apparatuses 10A and 10B is a MAC frame.

Each MAC frame includes a MAC Header, a Frame Body, and an FCS (Frame Check Sequence). In the MAC Header, information necessary for reception processing of the MAC layer is set. In the Frame Body, information corresponding to the type of the frame (e.g., data from an upper layer, etc.) is set. In the FCS, a cyclic redundancy code (CRC), which is an error detection code used to determine whether the MAC Header and the Frame Body have been correctly received or not, is set.

The MAC Header includes a Frame Control field, a Duration/ID field, and the like. In the Frame Control field, values in accordance with the type of the frame are included. In the Duration/ID field, a period for standing by the transmission (NAV: Network Allocation Vector) or an identification number (ID) allocated to the wireless communication apparatus is set. The Duration/ID field has a 16-bit length. In a case where the most significant bit (MSB) is zero, the lower 15 bits are indicative of a Duration (NAV). In a case where the MSB is one, a part of the lower 15 bits is indicative of an ID (identification number). In that case, the current 802.11 wireless LAN standard specifies that the lower 15th bit is one, the lower 12th to 14th bits are zero, and the remaining lower 11 bits (that is, the lower first to 11th bits), which may represent values of 1 to 2007, are used to indicate the ID.

This ID is an Association ID (AID) allocated to a station (STA) by an access point (AP). The AID is a number that is locally generated in the network (BSS) to which the AP belongs and is allocated to the STA if the AP permits the STA, which transmits a connection request (Association Request) frame, to make connection. The number within a designated range other than zero is allocated to the AID, and the number is unique in the BSS. In the present embodiment, the wireless communication apparatus on the data transmission side is an STA if the wireless communication apparatus on the data reception side is an AP, and the wireless communication apparatus on the data transmission side is an AP if the wireless communication apparatus on the data reception side is an STA. For example, if the wireless communication apparatuses 10A and 10B are APs and the wireless communication apparatus 2 is an STA, the wireless communication apparatuses 10A and 10B allocates an AID to the wireless communication apparatus 2. In contrast, if the wireless communication apparatuses 10A and 10B are STAs and the wireless communication apparatus 2 is an AP, the wireless communication apparatus 2 allocates AIDs to the wireless communication apparatuses 10A and 10B, respectively.

The AP transmits a connection response (Association Response) frame, which includes an allocated AID, to the STA permitted to make connection. The STA reads the AID from the connection response frame to recognize the AID of the own apparatus. In addition, the connection response frame includes information indicative of permission of connection. Thus, if the STA receives the connection response frame, the STA belongs to the BSS configured by the AP and may thereafter make communication with the AP. Such a connection process is referred to as an association process. The wireless communication apparatus on the data transmission side may perform an authentication process prior to performing the association process.

In the present embodiment, the association process is assumed to be completed between the wireless communication apparatuses 10A and 10B on the data transmission side and the wireless communication apparatus 2 on the data reception side.

The descriptions return to explanation of the MAC frame. The MAC Header includes multiple Address fields. In an Address 1 field, a MAC address (a Receiving STA Address: RA) of a wireless communication apparatus that is the next destination is set. In an Address 2 field, a MAC address (a Transmitting STA Address: TA) of a wireless communication apparatus that is the current sender is set. In an Address 3 field, a MAC address (a Destination Address: DA) of a wireless communication apparatus that is the eventual destination is set for the uplink, and a MAC address (a Source Address: SA) of a wireless communication apparatus that is the original sender on the data transmission side is set for the downlink. An Address 4 field exists only in a case where a wireless communication base station (a fixed station) transmits data to the other wireless communication base station. In the Address 4 field, a MAC address (an SA) of a wireless communication apparatus that is the data generation source is set. The number of these Address fields is varied depending on the frame type specified by using a Type/Subtype field to be described later.

In a Sequence Control field, a sequence number of data to be transmitted is set. If the data is fragmented into data portions, a fragment number of one of the data portions is set in the Sequence Control field.

The Frame Control field includes the Type field and the Subtype field indicative of the frame type, a To DS field, a From DS field, a more fragment field, a protected frame field, an order field, and the like.

It can be determined which frame type of a control frame, a management frame, and a data frame the frame belongs to, by the bits set in the Type field. Furthermore, the type of MAC frame in each frame type is indicated by the bits set in the Subtype field.

In the To DS field, information that indicates whether the receiving station is a wireless communication base station is set. In From DS field, information that indicates whether the transmitting station is a wireless communication base station is set. In the More Fragment field, information that indicates whether there is a subsequent fragment frame is set, in a case where the data is fragmented. In the protected frame field, information that indicates whether this frame is protected is set. In the order field, information indicating that the order of frames must not be changed when the frames are relayed is set.

In a case where this frame is a QoS Data frame, which is one of data frames, a QoS Control field is added to the frame (in contrast, the QoS Control field is not added to the frame in the case of a non-QoS Data frame). In the Type field of the frame, bits indicative of the data frame is set, and in the Subtype field of the frame, bits indicative of a QoS Data frame or a non-QoS Data frame is set.

The QoS control field includes a TID field (16 types including 0 to 15) in which an identifier corresponding to the data traffic is set, an Ack policy field in which an acknowledgment method is set, and the like (none of the fields is shown). In the TID field, the traffic type of the data is set. In the Ack policy field, information indicative of Normal Ack policy, Block Ack policy, or No Ack policy with which the QoS Data frame is transmitted is set.

In a High Throughput (HT) Control field, bits indicating that one is set in the order field in a case where this frame is a QoS Data frame or a management frame are set. The HT Control field may be expanded to a Very High Throughput (VHT) Control field and a High Efficient (HE) Control field. Therefore, notification corresponding to each of various functions of 802.11n, 802.11ac and 802.11ax can be achieved.

The MAC frame may further include a delimiter field to combine data frames and perform frame aggregation.

The configuration of a MAC header is not limited to the described fields. A new field may be added to the MAC header in accordance with new IEEE802.11 standard as QoS Control field is added under IEEE802.11e standard.

Figure 6:
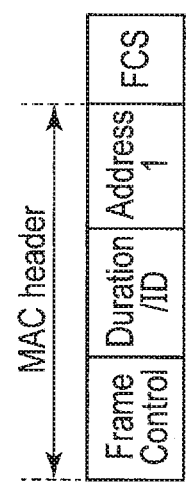
FIG. 6 is a diagram illustrating a format of an Ack frame of the first embodiment.

Next, an Ack frame will be described. FIG. 6 is the format of the Ack frame in the wireless LAN system under IEEE802.11 standard. In the present embodiment, an acknowledgment frame transmitted by the wireless communication apparatus 2 is an Ack frame.

In the Type and Subtype sub-fields (both not shown) of the Frame Control field, a bit pattern indicating that the frame is an Ack frame. In the Address 1 field, destination information is set such that a wireless communication apparatus, which is the transmission destination of the Ack frame, can recognize the own apparatus as the transmission destination. In a case where the wireless communication apparatus on the data reception side has received the above-described data frame without an error, the wireless communication apparatus, which has transmitted the data frame, is set as the destination. In contrast, in a case where reception of the data frame includes an error, the wireless communication apparatus, which has transmitted the data frame, is not set in the Address 1 field even if the wireless communication apparatus is already known. In other words, the wireless communication apparatus, which has received the data frame, returns the ACK frame if the reception is successful, and does not return the ACK frame if the reception is unsuccessful.

Figure 7:
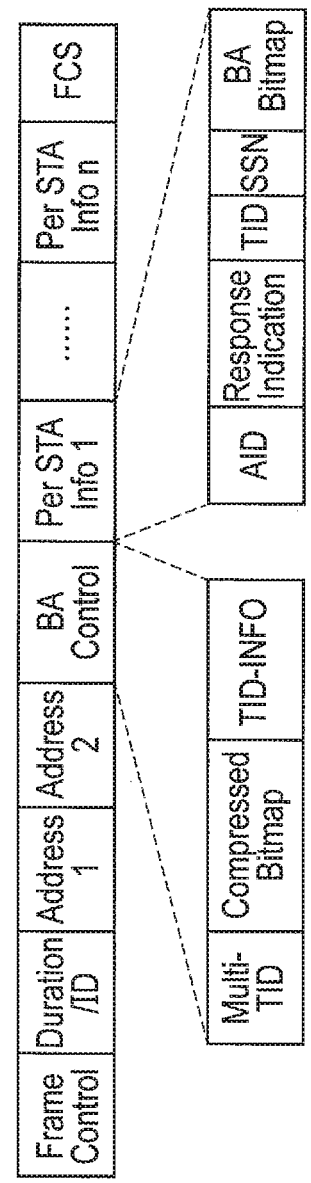
FIG. 7 is a diagram illustrating a format of a Block Ack frame of the first embodiment.

In addition, a Block Ack frame may be used as the acknowledgment frame instead of the Ack frame. The Block Ack frame will also be described. FIG. 7 is the format of the Block Ack frame in the wireless LAN system under IEEE802.11 standard. In the present embodiment, an acknowledgment frame transmitted from the wireless communication apparatus 2 may be a Block Ack frame.

The roles of the fields from a Frame Control field to an Address 2 field are the same as those in the MAC frame format shown in FIG. 5. In the Type and Subtype sub-fields (both not shown) of the Frame Control field, a bit pattern indicative of a Block Ack frame is set.

In the Address 1 field, destination information is set such that each of multiple wireless communication apparatuses, which are the transmission destinations of the Block Ack frame, can recognize the own apparatus as the transmission destination. The Address 2 field includes information of the sender of the Block Ack frame. A MAC address (similar to the identifier of the BSS, i.e., the Basic Service Set Identifier (BSSID)) is included as the information of the sender.

In the BA Control field, information common to multiple wireless communication apparatuses that are the destinations of the Block Ack frame is set. More specifically, the BA Control field includes a Multi-TID field, a Compressed Bitmap field, and a TID_INFO field. The fields included in the BA Control field are not limited to these, but different fields may be included if they can make the same identifications.

The Multi-TID field indicates that the frame includes pieces of acknowledgment information (BA Bitmap information) for data frames having different TIDs. Each acknowledgment information is information indicating that a frame transmitted from a wireless communication apparatus on the data transmission side has been received without an error.

In the Compressed Bitmap field, it is set whether sixty-four serial sequence numbers corresponding to up to conventional sixteen fragments are changed as the length of the subsequent BA Bitmap field. More specifically, the length of the BA Bitmap field is eight octets (64 bits) including no fragment information if one is set in the Compressed Bitmap field, and the length of the BA Bitmap field is 128 octets that enable the fragment information to be expressed up to 16 if zero is set in the Compressed Bitmap field. In addition, a manner of use and the length of the BA Bitmap field may be able to be obtained by combining the other fields in the BA Control field and a Per STA Info field.

In the TID_INFO field, a TID common to subsequent acknowledgment information (BA Bitmap information) is indicated. The acknowledgment information for the data frame of the TID indicated in the TID_INFO field is included in the BA Bitmap. In a case where multiple TIDs are set in the Block Ack frame, the TID_INFO field may be reserved, or information on the number such as the number of included TIDs −1 is set in the TID_INFO field.

In the Per STA Info field, information inherent to the wireless communication apparatus that is the transmission destination of the Block Ack frame is set. In a case where the wireless communication apparatus on the data reception side transmits an acknowledgment response to multiple wireless communication apparatuses, Per STA Info fields, which is the same as the number of the wireless communication apparatuses, are set. The Per STA Info field includes an AID field, a Response Indication field, a TID field, an SSN (Starting Sequence Number) field, and a BA Bitmap field.

In the AID field, the AID allocated to the wireless communication apparatus on the data reception side by the association process is set. In the Response Indication field, an Ack format or a Block Ack format is set as the format of response to the wireless communication apparatus on the data transmission side.

If the response format is the Ack format, the format indicates that a frame transmitted from the wireless communication apparatus on the data transmission side has been received correctly (without error). If this frame is an Aggregate frame (i.e., the frame obtained by combining MAC frames into a PHY frame and transmitted), the format indicates that all the MAC frames have been received correctly.

If this response format is the Block Ack format, the format means that for the Aggregate frame transmitted from the wireless communication apparatus on the data transmission side, the sequence numbers (and the fragment numbers) of the correctly received MAC frames are indicated in the subsequent BA Bitmap field. Thus, if the format indicates the Ack format, the SSN field and BA Bitmap field may be omitted.

In the TID field, a TID of the acknowledgment information indicated in the subsequent BA Bitmap field is set, in the case of Multi-TID.

In the SSN field, a sequence number of the leading frame, of the frames corresponding to the acknowledgment information indicated in subsequent BA Bitmap field is set.

In the BA Bitmap field, the acknowledgment information for the Aggregate frame, which is transmitted from the wireless communication apparatus on the data transmission side, is indicated as the bitmap format of one bit for each MAC frame. More specifically, the length of the BA Bitmap is 64 bits including no fragment information, and the sequence number of a frame corresponding to a target bit of the bits is increased by one every time the target bit is shifted by one bit from the leading bit. A sequence number of the frame corresponding to the leading bit is indicated in the SSN field. That is, the leading bit of the BA Bitmap indicates acknowledgment information for the data frame at the sequence number (SSN) indicated in the SSN field, and the next bit indicated acknowledgment information for the data frame at the sequence number SSN+1. For example, if the SSN is 100, acknowledgment information for the data frames of sequence numbers 100 to 163 is indicated in the BA Bitmap field.

Figure 8:
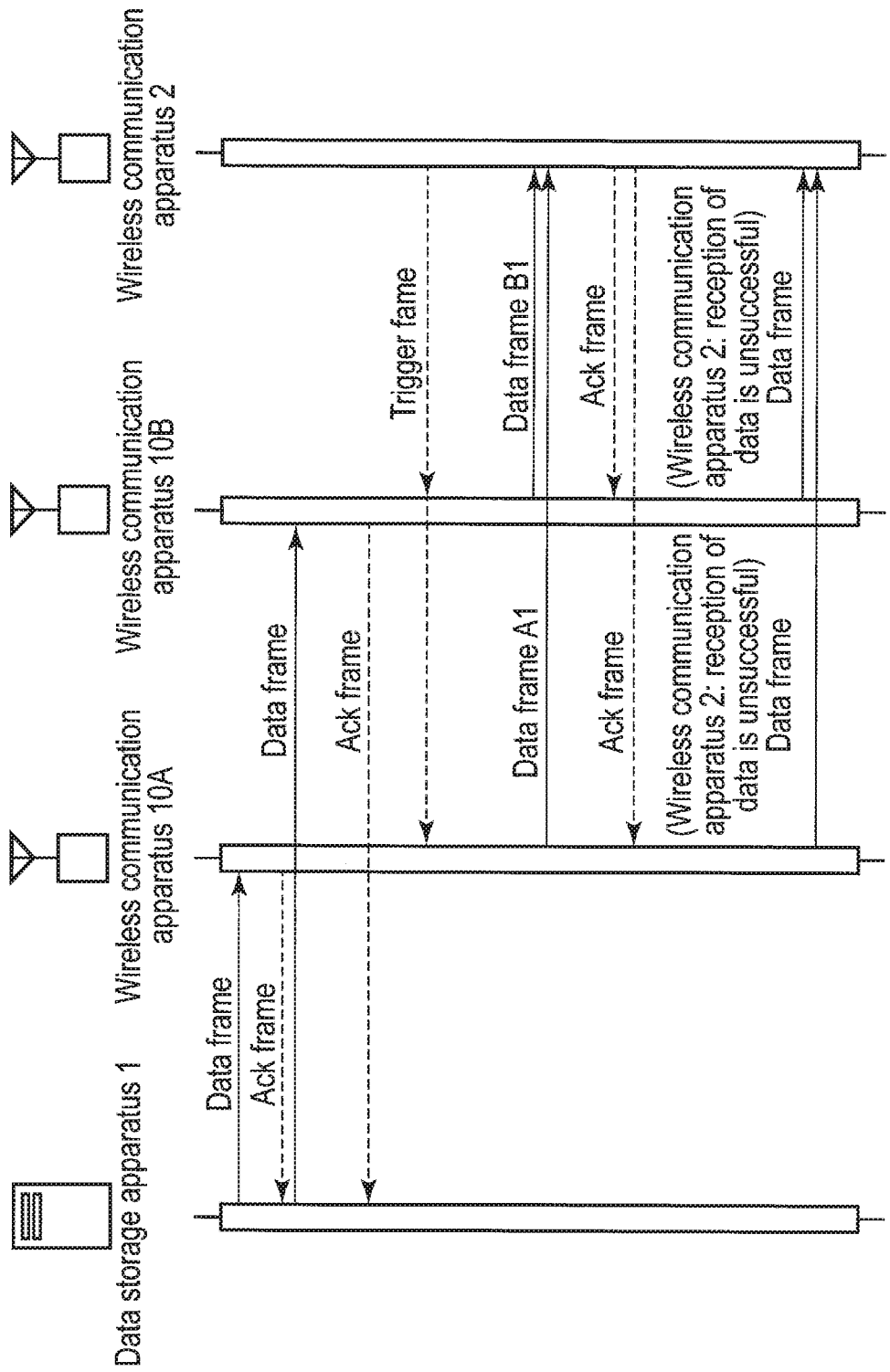
FIG. 8 is a diagram illustrating a sequence in a wireless communication system of the first embodiment.

FIG. 8 illustrates a sequence of the wireless communication system according to the first embodiment. The operations of the wireless communication system including the data storage apparatus 1, the wireless communication apparatuses 10A and 10B, and the wireless communication apparatus 2, in the first embodiment, will be described with reference to FIG. 8. It will be explained below that in the present embodiment, the wireless communication apparatuses 10A and 10B transmit data frames in parallel by frequency-division multiplexing. The data storage apparatus 1, the wireless communication apparatuses 10A and 10B, and the wireless communication apparatus 2 recognize addresses of these wireless communication apparatuses and perform time synchronization in advance.

First, the wireless communication apparatuses 10A and 10B receive data frames from the data storage apparatus 1, respectively. The data frames include the same data to be transmitted to the wireless communication apparatus 2. Each of the wireless communication apparatuses 10A and 10B, which has received the data frame, transmits an Ack frame as an acknowledgment frame to the data storage apparatus 1. If each of the wireless communication apparatuses 10A and 10B fails in reception of the data frame, it stands by and attempts again reception of the data frame from the data storage apparatus 1. Each data frame includes information that the data storage apparatus 1 transmits the same data to the wireless communication apparatuses 10A and 10B. The wireless communication apparatuses 10A and 10B recognize that the data transmitted from the data storage apparatus 1 are the same, based on this information.

Next, the wireless communication apparatuses 10A and 10B receive a trigger frame from the wireless communication apparatus 2. The trigger frame is transmitted to the wireless communication apparatuses 10A and 10B when the wireless communication apparatus 2 requires data. The wireless communication apparatuses 10A and 10B recognize that the destinations of the trigger frame are the wireless communication apparatuses 10A and 10B, by referring to the Address 1 field of the trigger frame. In addition, the wireless communication apparatuses 10A and 10B recognize that the sender of the trigger frame is the wireless communication apparatus 2, by referring to the Address 2 field. If the wireless communication apparatuses 10A and 10B have received the trigger frame, they transmit a data frame A1 and a data frame B2 to the wireless communication apparatus 2, respectively. If each of the wireless communication apparatuses 10A and 10B fails in reception of the trigger frame, it attempts again reception of a trigger frame from the wireless communication apparatus 2.

In addition, each of the wireless communication apparatuses 10A and 10B recognizes receiving a command to transmit data, by referring to the Request Indication field in the trigger frame. A rule is assumed to be established between the wireless communication apparatuses 10A and 10B and the wireless communication apparatus 2. The rule indicates that the wireless communication apparatuses 10A and 10B recognizing this command transmit data frames including the same data, respectively, to the wireless communication apparatus 2 indicated in the Address 2 field.

In addition, each of the wireless communication apparatuses 10A and 10B recognizes settings of the transmission time of the data frame and the transmission frequency band of the data frame by referring to the UL Length field and the Common PHY parameter field. In the present embodiment, since the wireless communication apparatuses 10A and 10B transmit the data frames in parallel by frequency-division multiplexing, the wireless communication apparatuses 10A and 10B transmit the data frames at the same transmission time but use the frequency bandwidths for the transmission that are different from each other. In accordance with the settings, the wireless communication apparatuses 10A and 10B transmit MAC frames in parallel by frequency-division multiplexing to the wireless communication apparatus 2. These MAC frames are data frames including the same data. In FIG. 8, the data frame transmitted from the wireless communication apparatus 10A is referred to as a data frame A1, and the data frame transmitted from the wireless communication apparatus 10B is referred to as a data frame B1.

The wireless communication apparatus 2 receives the multiplexed data frames and demultiplexes the multiplexed data frames into two data frames. Next, the wireless communication apparatus 2 attempts error detection to determine whether reception of each data frame is successful based on a CRC set in the FCS field of the data frame.

The wireless communication apparatus 2 transmits Ack frames to the wireless communication apparatuses 10A and 10B as acknowledgment frames if the reception of both of the two data frames is successful. If only the reception of the data frame A1 is successful, the wireless communication apparatus 2 transmits an Ack frame to the wireless communication apparatus 10A and does not transmit an Ack frame to the wireless communication apparatus 10B. If only the reception of the data frame B1 is successful, the wireless communication apparatus 2 transmits an Ack frame to the wireless communication apparatus 10B and does not transmit an Ack frame to the wireless communication apparatus 10A. If the reception of both of the two data frames is unsuccessful, the wireless communication apparatus 2 does not transmit any Ack frame.

The wireless communication apparatuses 10A and 10B receive an Ack frame even if the destination of the Ack frame is not the own apparatus. If the Address 1 field of the Ack frame indicates at least one of the wireless communication apparatuses 10A and 10B, the data frame including the data is not retransmitted. This is because the wireless communication apparatus 2 has successfully received the data. In other words, if the wireless communication apparatuses 10A and 10B have not received an Ack frame whose destination is the wireless communication apparatus 10A or an Ack frame whose destination is the wireless communication apparatus 10B, from the wireless communication apparatus 2, the wireless communication apparatus 10A and 10B recognize that the wireless communication apparatus 2 has failed in the reception of the two data frames, and retransmit the data frame including the data after a certain time. This certain time is established as a rule between the wireless communication apparatuses 10A and 10B. In addition, the wireless communication apparatuses 10A and 10B retransmit the data frame in parallel by frequency-division multiplexing with the frequency bandwidths previously designated by the trigger frame.

Figure 9:
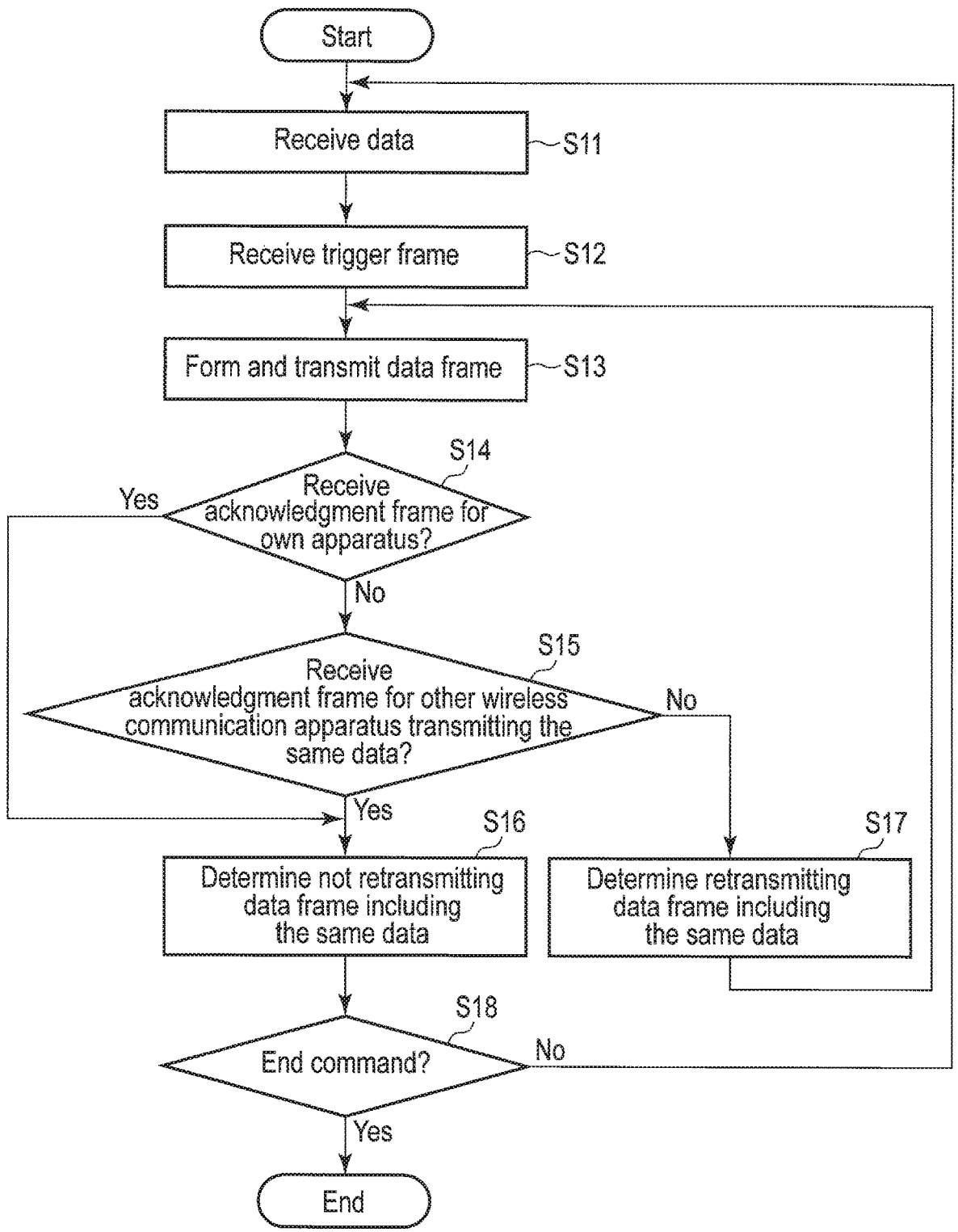
FIG. 9 is a flowchart illustrating an operation by the electronic apparatus of the first embodiment.

FIG. 9 is a flowchart illustrating an operation of the wireless communication apparatus 10A according to the first embodiment. An operation of the wireless communication apparatus 10A according to the present embodiment will be explained with reference to FIG. 9. The wireless communication apparatus 10B shown in FIG. 1 and FIG. 8 performs the same operation as those described below.

First, the receiver 13A receives a data frame from a data storage apparatus (step S11). The receiver 13A verifies whether the reception of the data frame is successful. If the reception is successful, the receiver 13A instructs the frame forming unit 14A to form an acknowledgment frame for the data storage apparatus. The data frame includes information that the data storage apparatus transmits the same data to the wireless communication apparatus 10A and another wireless communication apparatuses on the data transmission side. The wireless communication apparatus 10A recognizes from the data frame that the same data is transmitted to the wireless communication apparatuses on the data transmission side (10A and 10B in the present embodiment) from the data storage apparatus. The frame forming unit 14A forms an acknowledgment frame for the data storage apparatus and instructs the transmitter 12A to transmit the acknowledgment frame. The transmitter 12A transmits the acknowledgment frame. In the present embodiment, the acknowledgment frame is an Ack frame but may be a Block Ack frame, and the transmitter 12A may multiplex the Ack frames and transmit the multiplexed frames in parallel.

Next, the receiver 13A receives a trigger frame from a wireless communication apparatus on the data reception side (step S12). With the trigger frame, the wireless communication apparatus 10A recognizes transmitting the data to the wireless communication apparatus on the data reception side. The receiver 13A verifies whether the reception of the trigger frame is successful. If the receiver 13A succeeds in reception of the trigger frame, it instructs the frame forming unit 14A to form a data frame for the wireless communication apparatus on the data reception side. The other wireless communication apparatus on the data transmission side (the wireless communication apparatus 10B in the present embodiment) also performs the same operation, and recognizes transmitting the data to the wireless communication apparatus on the data reception side.

Next, the frame forming unit 14A forms a MAC frame for the wireless communication apparatus on the data reception side as a data frame A1 including the data received from the data storage apparatus 1, under the settings specified in the trigger frame, and the transmitter 12A transmits the data frame A1 (step S13). The other wireless communication apparatus on the data transmission side also performs the same operation, and transmits a data frame B1 to the wireless communication apparatus on the data reception side. In the present embodiment, the transmitter 12A transmits the data frame A1 in parallel with the data frame B1 by frequency-division multiplexing the data frame A1 on the data frame B1, but may transmit the data frame A1 by space division multiplexing, code multiplexing, or orthogonal frequency-division multiplexing instead of frequency-division multiplexing, according to the settings specified in the trigger frame. Alternatively, the transmitter 12A may not perform the parallel (simultaneous) transmission but perform partial multiplexing by shifting the transmission time.

Next, the receiver 13A attempts receiving an acknowledgment frame transmitted when the wireless communication apparatus on the data reception side has succeeded in receiving the data frame (step S14).

If the receiver 13A has received an acknowledgment frame for the wireless communication apparatus 10A from the wireless communication apparatus on the data reception side (step S14: Yes), the retransmission determination unit 15A determines that the wireless communication apparatus on the data reception side has successfully received the data and also determines that the data frame A1 may not be retransmitted (step S16).

In contrast, if the receiver 13A has not received an acknowledgment frame for the wireless communication apparatus 10A from the wireless communication apparatus on the data reception side (step S14: No), the receiver 13A attempts receiving an acknowledgment frame for the other wireless communication apparatus on the data transmission side that transmitted the same data (step S15).

If the receiver 13A receives an acknowledgment frame for the other wireless communication apparatus on the data transmission side that transmitted the same data (step S15: Yes), the retransmission determination unit 15A determines that the wireless communication apparatus on the data reception side has successfully received the data and determines that the data frame A1 may not be retransmitted (step S16).

In contrast, if the receiver 13A has not received an acknowledgment frame for the other wireless communication apparatus on the data transmission side that transmitted the same data (step S15: No), the retransmission determination unit 15A determines that the wireless communication apparatus on the data reception side has failed in reception of the data and determines that the data frame A1 is retransmitted after a certain time (step S17). Then, the flow returns to step S13. The other wireless communication apparatus on the data transmission side also performs the same operation to determine whether to retransmit the data frame B1.

After step S16, the wireless communication apparatus 10A confirms whether an end command input by the user has been received (step S18). This end command instructs the operation to be ended in the flow which the wireless communication apparatus 10A currently processes, and the wireless communication apparatus 10A receives the end command in accordance with the user's input to the wireless communication apparatus 10A, or via the receiver 13A receiving the signal including the end command. If the end command has not been confirmed, the flow returns to step S11. If the end command has been confirmed, the flow ends. The wireless communication apparatus 10A may immediately end the operation in response to this end command. The other wireless communication apparatus on the data transmission side also performs the same operation to confirm whether an end command input by the user has been received.

Table 1 is a data retransmission determination table of the present embodiment. The table shows whether the wireless communication apparatus 2 has succeeded or failed in reception of the data frame A1 transmitted from the wireless communication apparatuses 10A and shows whether the wireless communication apparatus 2 has succeeded or failed in reception of the data frame B1 transmitted from the wireless communication apparatuses 10B. Furthermore, the table also shows determination of the retransmission determination units 15A and 15B of the wireless communication apparatuses 10A and 10B on whether to retransmit the data frame including the same data.

TABLE 1

| Success or failure of reception of data frame A1 | Success or failure of reception of data frame B1 | Determination of data retransmission by retransmission determination unit |
| --- | --- | --- |
| Success | Success | Not retransmit |
| Failure | Success | Not retransmit |
| Success | Failure | Not retransmit |
| Failure | Failure | Retransmit |

If the receivers 13A and 13B receive Ack frames that include the Address 1 fields indicative of the wireless communication apparatuses 10A and 10B, the retransmission determination units 15A and 15B determine that the wireless communication apparatus 2 has succeeded in the reception of the data frames A1 and B1 (Table 1: the second row from the top). The retransmission determination units 15A and 15B determine that the wireless communication apparatus 2 also has succeeded in reception of the same data included in these two data frames, and then determines that retransmission of data frames including the data may not be performed.

If the receivers 13A and 13B receive an Ack frame that includes the Address 1 field indicative of the wireless communication apparatus 10B, the retransmission determination units 15A and 15B determine that the wireless communication apparatus 2 has succeeded in reception of the data frame B1 but has failed in reception of the data frame A1 (Table 1: the third row from the top). The retransmission determination units 15A and 15B determine that the wireless communication apparatus 2 also has succeeded in reception of the data and then determines that retransmission of data frames including the data may not be performed.

If the receivers 13A and 13B receive an Ack frame that includes the Address 1 field indicative of the wireless communication apparatus 10A, the retransmission determination units 15A and 15B determine that the wireless communication apparatus 2 has succeeded in reception of the data frame A1 but has failed in reception of the data frame B1 (Table 1: the fourth row from the top). The retransmission determination units 15A and 15B determine that the wireless communication apparatus 2 also has succeeded in reception of the data and then determines that retransmission of data frames including the data may not be performed.

If the receivers 13A and 13B has failed in reception of an Ack frame that includes the Address 1 field indicative of at least one of the wireless communication apparatuses 10A and 10B, the retransmission determination units 15A and 15B determine that the wireless communication apparatus 2 has failed in reception of the data frames A1 and B1 (Table 1: the fifth row from the top). The retransmission determination units 15A and 15B determine that the wireless communication apparatus 2 has failed in reception of the data and then determines that retransmission of data frames including the data should be performed.

The present embodiment has been described above, and modified examples can be variously performed. For example, one antenna 11A is provided in FIG. 2, but two or more antennas may be provided as a modified example of the structure of the wireless communication apparatus 10A. If multiple antennas are provided, they may be classified into antennas for transmission and antennas for reception. The transmitter 12A, the receiver 13A, the frame forming unit 14A, and the retransmission determination unit 15A may be physically integrated and built in a semiconductor integrated circuit. In addition, variously modified examples of the wireless communication apparatus 2 may also be performed similarly to the wireless communication apparatus 10A. Furthermore, the wireless communication apparatus 2 may have a retransmission control function similar to the conventional function. In this case, the wireless communication apparatus 2 performs determination of not retransmitting a data frame when receiving an acknowledgment frame for the own apparatus, but does not perform determination of retransmitting a data frame when receiving an acknowledgment frame for the other wireless communication apparatus.

In addition, in the present embodiment, the wireless communication apparatuses 10A and 10B receive the same data from the data storage apparatus 1, but may receive (acquire) the data from an application or an upper-order layer of each of the wireless communication apparatuses 10A and 10B without using the data storage apparatus 1. In addition, the same data may be received (shared) by executing communication between the wireless communication apparatuses 10A and 10B without using the data storage apparatus 1. In this case, when the wireless communication apparatuses 10A and 10B receive the data, the wireless communication apparatuses 10A and 10B recognize receiving the same data. In addition, two wireless communication apparatuses 10A and 10B may not receive time information or may be set not to adjust the time. In a case where the time adjustment is not performed, parallel (or simultaneous) transmission is not performed.

In addition, if a rule that data transmitted from the wireless communication apparatuses 10A and 10B are the same is set between the wireless communication apparatus 2 and the wireless communication apparatuses 10A and 10B, the data acquired by the wireless communication apparatuses 10A and 10B may be transmitted to the wireless communication apparatus 2 without being shared by the wireless communication apparatuses 10A and 10B. In this case, it is assumed that the wireless communication apparatuses 10A and 10B are attached to apparatuses that creates information. For example, it is assumed that the wireless communication apparatuses 10A and 10B are attached to inspection apparatuses A and B to transmit inspection information obtained from the inspection apparatuses to the wireless communication apparatus 2. When the wireless communication apparatus 2 needs only to receive the inspection information of at least one of the inspection apparatuses, the inspection information of the wireless communication apparatuses 10A and 10B may be transmitted to the wireless communication apparatus 2 without being shared.

In addition, in the present embodiment, the data frame transmitted from the data storage apparatus 1 includes the information that the data storage apparatus 1 transmits the same data to the wireless communication apparatuses 10A and 10B, but the data storage apparatus 1 may preliminarily notify the wireless communication apparatuses 10A and 10B of a transmission destination list of each piece of data. The wireless communication apparatuses 10A and 10B may determine that data transmitted from the data storage apparatus 1 are the same data or different data, by using the list.

In addition, as regards the method of notifying that the wireless communication apparatuses 10A and 10B receive the same data, the wireless communication apparatus 2 may notify the reception. The data storage apparatus 1, the wireless communication apparatus 2, and the wireless communication apparatuses 10A and 10B share a list of pieces of data, which should be delivered to the wireless communication apparatus 2, in advance. If the wireless communication apparatuses 10A and 10B receive a piece of data indicated in this list from the data storage apparatus 1 and receive a trigger frame from the wireless communication apparatus 2 so as to transmit the piece of data, the wireless communication apparatuses 10A and 10B can recognize transmitting the same piece of data.

In the present embodiment, the trigger frame is transmitted from the wireless communication apparatus 2 to the wireless communication apparatuses 10A and 10B. However, the wireless communication apparatus 2 may not transmit the trigger frame and the wireless communication apparatuses 10A and 10B may be notified of settings of the data frames when the wireless communication apparatuses 10A and 10B receive the same data from the data storage apparatus 1. Alternatively, the wireless communication apparatus 2 may not transmit the trigger frame, and the setting may be transmitted by an agreement between the wireless communication apparatuses 10A and 10B.

In the present embodiment, the trigger frame is transmitted to the wireless communication apparatuses 10A and 10B from the wireless communication apparatus 2. Since the trigger frame in the wireless LAN system under IEEE802.11 standard is transmitted from an AP to an STA, the wireless communication apparatus 2 serves as an AP and the wireless communication apparatuses 10A and 10B serve as STAs. However, an STA may transmit a frame having a function similar to that of the trigger frame. In this case, even if the wireless communication apparatus 2 serves as an STA and the wireless communication apparatuses 10A and 10B serve as APs, the wireless communication apparatus 2 is capable of transmitting a frame having the function similar to that of the trigger frame to the wireless communication apparatuses 10A and 10B.

In the present embodiment, the wireless communication apparatus 2 transmits a trigger frame to the wireless communication apparatuses 10A and 10B when the wireless communication apparatus 2 needs data, but a rule that the wireless communication apparatus 2 transmits a trigger frame at each certain time may be set between the wireless communication apparatus 2 and the wireless communication apparatuses 10A and 10B. In addition, if the wireless communication apparatus 2 is AP, a method of inquiring about data to be transmitted of the wireless communication apparatuses 10A and 10B, which are STAs, may be employed.

In the present embodiment, a rule that the wireless communication apparatuses 10A and 10B transmit data frames after a certain time when determining retransmitting the data frames including the same data, is determined in advance in each of the wireless communication apparatuses 10A and 10B. However, the wireless communication apparatuses 10A and 10B may await a trigger frame from the wireless communication apparatus 2 over again.

In the present embodiment, the Ack frame is used as the acknowledgment frame, but the Block Ack frame may be used. Multiple wireless communication apparatuses may be set in the Address 1 field of the Block Ack frame (indicating the transmission destinations of the Block Ack frame). For example, if the wireless communication apparatus 2 has succeeded in reception of the data frames A1 and B1, the addresses of both the wireless communication apparatuses 10A and 10B are indicated in the Address 1 field of the Block Ack frame. Thus, the wireless communication apparatuses 10A and 10B can be notified of the acknowledgment of the wireless communication apparatus 2 by one frame. If the wireless communication apparatus 2 has succeeded in reception of the data frame A1 alone, the address of the wireless communication apparatus 10A is indicated in the Address 1 field. On the other hand, if the wireless communication apparatus 2 has succeeded in reception of the data frame B1 alone, the address of the wireless communication apparatus 10B is indicated in the Address 1 field. If the wireless communication apparatus 2 has failed in reception of the data frames A1 and B1, the Block Ack frame is not transmitted.

In the present embodiment, the wireless communication apparatus 2, which has transmitted the trigger frame, operates based on the rule that the data frames from the wireless communication apparatuses 10A and 10B include the same data. However, the wireless communication apparatuses 10A and 10B may use the Block Ack frame, which is the acknowledgment frame, to confirm whether the wireless communication apparatus 2 has received the data frames including the same data. More specifically, the wireless communication apparatuses 10A and 10B attach the same sequence number to the data frames including the same data and transmit the data frames with the sequence number. If the wireless communication apparatus 2 has succeeded in reception of the data frames, the wireless communication apparatus 2 may transmit a Block Ack frame that indicates the TIDs of the wireless communication apparatuses, which is the sender of the data frames, and the sequence number of the data frames. Based on the values in the Address 2 field, the AID field, and the TID field, and the sequence number included in the Block Ack frame from the wireless communication apparatus 2, the wireless communication apparatuses 10A and 10B recognize that the wireless communication apparatus 2, which is indicated in the Address 2 field or the AID field, has succeeded in reception of the data frames corresponding to the sequence number and the TIDs. If these pieces of information in the Block Ack frame correspond to the pieces of information in the data frames transmitted from the wireless communication apparatuses 10A and 10B, the wireless communication apparatuses 10A and 10B may determine that the data frames are not retransmitted.

In the present embodiment, two data frames are transmitted in parallel using frequency-division multiplexing, but may not be multiplexed or may not be transmitted in parallel. In this case, the wireless communication apparatus 2 transmits an acknowledgment frame to a wireless communication apparatus that is the sender of a data frame successfully received in a certain time period. The subsequent operations of the wireless communication apparatuses 10A and 10B are the same as those of the present embodiment and their explanations will be omitted. In addition, the transmitters 12, 12A, and 12B in this case may not have a function of multiplexing data frames, and the receivers 13, 13A, and 13B may not have a function of demultiplexing multiplexed data frames.

If the wireless communication apparatus 2 has succeeded in reception of a data frame from one of the wireless communication apparatuses 10A and 10B, the wireless communication apparatus 2 transmits an acknowledgment frame whose destination is the one of the wireless communication apparatuses 10A and 10B. At this time, if the other wireless communication apparatus has not transmitted a data frame yet, the other wireless communication apparatus may recognize that the wireless communication apparatus 2 has succeeded in reception of the data frame from the one of the wireless communication apparatuses 10A and 10B, by using the Address 1 field in the acknowledgment frame. Then, the other wireless communication apparatus may determine not to transmit a data frame since transmission of the data frame becomes unnecessary. In this case, the other wireless communication apparatus may confirm whether the wireless communication apparatus 2 has received the data frame including the same data, based on the Block Ack frame transmitted from the wireless communication apparatus 2.

For example, it is assumed that a case where the wireless communication apparatus 10A transmits the data frame A1 to the wireless communication apparatus 2, and the receiver 13B then receives an Ack frame for the wireless communication apparatus 10A before the wireless communication apparatus 10A transmits the data frame B1 to the wireless communication apparatus 2. In this case, the retransmission determination unit 15B may determine that the wireless communication apparatus 2 has already received the data in the data frame B1 and instruct the transmitter 12B not to transmit the data frame B1.

In a case where a rule that the same sequence number should be attached to data frames including the same data is set in the wireless communication apparatuses 10A and 10B and the acknowledgment frame for the wireless communication apparatus 10A is a Block Ack frame, the retransmission determination unit 15B may confirm the sequence number of the data frame A1 included in the Block Ack frame. Then, if the confirmed sequence number is the same as the sequence number of the data frame B1, the retransmission determination unit 15B may determine that the wireless communication apparatus 2 has already received the data in the data frame B1 and instruct the transmitter 12B not to transmit the data frame B1.

If the Block Ack frame is used as the acknowledgment frame, the wireless communication apparatus 2 can notify the wireless communication apparatuses 10A and 10B of the success of reception of data frames at once even if the wireless communication apparatuses 10A and 10B transmit these data frames, respectively. In addition, the wireless communication apparatus 2 can use the AID field, the Address 2 field, the sequence number, the TID field, and the like in the Block Ack frame to notify the wireless communication apparatuses 10A and 10B of a data frame that has been received successfully and/or a data frame that has been received unsuccessfully, of the data frames transmitted from the wireless communication apparatuses 10A and 10B. The wireless communication apparatuses 10A and 10B may retransmit only a specific data frame of the data frames, based on the Block Ack frame.

Figure 10:
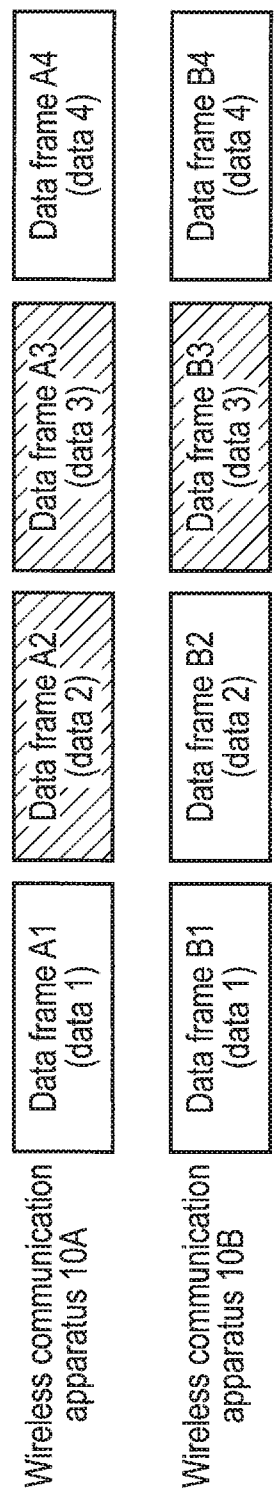
FIG. 10 is a diagram illustrating a state in which multiple pieces of data are received in the first embodiment.

For example, FIG. 10 illustrates a case where the wireless communication apparatuses 10A and 10B transmit data frames A1, A2, A3, A4, B1, B2, B3, and B4 as data frames for transmitting four pieces of data. These four pieces of data to be transmitted to the wireless communication apparatus 2 are data 1, data 2, data 3, and data 4. Data frames with white color indicate the data frames which the wireless communication apparatus 2 has successfully received. That is, the wireless communication apparatus 2 has succeeded in the reception of the data frame A1, the data frame A4, the data frame B1, the data frame B2, and the data frame B4. Thus, the wireless communication apparatus 2 has succeeded in the reception of the data 1, the data 2, and the data 4. In this case, the wireless communication apparatuses 10A and 10B are assumed to recognize that they transmit the same data to the wireless communication apparatus 2, by the means explained in the present embodiment. That is, the wireless communication apparatuses 10A and 10B are assumed to recognize that the data frames A1 and B1 include the same data 1, that the data frames A2 and B2 include the same data 2, that the data frames A3 and B3 include the same data 3, and that the data frames A4 and B4 include the same data 4.

In contrast, the wireless communication apparatus 2 has failed in the reception of the data frame A2, the data frame A3, and the data frame B3. Thus, the wireless communication apparatus 2 has failed in the reception of the data 3. The wireless communication apparatuses 10A and 10B recognize data frames that has been successfully received, by referring to the AID, the Address 2, the sequence number, the TID, and the like included in the Block Ack frame transmitted from the wireless communication apparatus 2. That is, the wireless communication apparatuses 10A and 10B may determine that the wireless communication apparatus 2 has failed in reception of the data 3 and retransmit the only data frames (A3 and B3) including the data 3.

In FIG. 10, each of the wireless communication apparatuses 10A and 10B transmits the data 1, the data 2, the data 3, and the data 4, which are different each other, to the wireless communication apparatus 2. Even if the data 1 is divided and transmitted, i.e., if the wireless communication apparatuses 10A and 10B transmit data 1a, data 1b, data 1c, and data 1d, which are obtained by the dividing, the operation is performed similarly to that shown in FIG. 10. However, a rule for a data dividing method such as dividing the data 1 into the data 1a, the data 1b, the data 1c, and the data 1d in both of the wireless communication apparatuses is required for the wireless communication apparatuses 10A and 10B. The data storage apparatus 1 may notify the wireless communication apparatuses 10A and 10B of this rule.

In the present embodiment, a rule that the wireless communication apparatuses 10A and 10B transmit data frames after a certain time period when determining retransmitting the data frames including the same data, is determined in advance in each of the wireless communication apparatuses 10A and 10B. However, the wireless communication apparatuses 10A and 10B may await a trigger frame from the wireless communication apparatus 2 over again.

In the present embodiment, the wireless communication apparatus 2 transmits a trigger frame and an Ack frame to each of the wireless communication apparatuses 10A and 10B but may transmit the frames in parallel by multiplexing.

In addition, in the present embodiment, the wireless communication apparatuses 10A and 10B include the retransmission determination units 15A and 15B, respectively, but one of the wireless communication apparatuses 10A and 10B may have a retransmission control function similar to the conventional function. The conventional wireless communication apparatus may be configured by simplifying the retransmission determination unit 15A. For example, a retransmission control unit 15a (not shown) may be configured to perform the conventional determination of not retransmitting a data frame including the same data when receiving an acknowledgment frame for the own apparatus. That is, the conventional wireless communication apparatus does not retransmit the data frame when receiving an acknowledgment frame whose destination is the own apparatus. The conventional wireless communication apparatus retransmits the data frame when it has not received an acknowledgment frame whose destination is the own apparatus. In addition, the conventional wireless communication apparatus retransmits the data frame even if receiving an acknowledgment frame whose destination is the other wireless communication apparatus.

For example, the wireless communication apparatus 10A that includes the retransmission determination unit 15A according to the present embodiment and a wireless communication apparatus B that is a conventional wireless communication apparatus are assumed to be provided. Since the operations are the same as the present embodiment until the two wireless communication apparatuses transmit data frames including the same data to the wireless communication apparatus 2, the operations will be therefore omitted. As is the case with the present embodiment, a data frame transmitted from the wireless communication apparatus 10A is referred to as a data frame A1, and a data frame transmitted from the wireless communication apparatus B is referred to as a data frame B1. The wireless communication apparatus 10A including the retransmission determination unit 15A performs the same determination of retransmission as that shown in FIG. 7. On the other hand, the wireless communication apparatus B performs retransmission of the data frame B1 if the wireless communication apparatus B has not received an Ack frame for the own apparatus from the wireless communication apparatus 2.

That is, if the wireless communication apparatus 2 has succeeded in reception of the data frame A1 but has failed in reception of the data frame B1, the data in the data frame A1 has been received by the wireless communication apparatus 2 but the wireless communication apparatus B additionally retransmits the data frame B1 including the same data. Therefore, the wireless communication apparatus on the data transmission side exerts the effect of not performing further retransmission as the wireless communication apparatus 10A including the retransmission determination unit 15A.

In the present embodiment, the two wireless communication apparatuses 10A and 10B on the data transmission side are provided, but three or more wireless communication apparatuses may be provided. If three or more wireless communication apparatuses on the data transmission side of the present embodiment are provided, the effect can be exerted similarly to the present embodiment. The wireless communication devices on the data transmission side are referred to as wireless communication devices 10. Each of the wireless communication apparatus 10 includes an antenna 11, a transmitter 12, a receiver 13, a frame forming unit 14, and a retransmission determination unit 15, similarly to the wireless communication apparatus 10A. As is the case with the present embodiment, a case where the wireless communication apparatuses on the data transmission side transmit data frames in parallel by multiplexing will be explained.

Each of the wireless communication apparatuses 10 first receives a data frame from the data storage apparatus 1, and transmits an Ack frame to the data storage apparatus 1 as an acknowledgment frame. Each data frame includes the same data to be transmitted to the wireless communication apparatus 2. Each of the wireless communication apparatuses 10 recognizes that the wireless communication apparatuses 10 receive the same data, based on the data frame.

Next, each of the wireless communication apparatuses 10 receives a trigger frame, which includes an instruction to transmit the data, from the wireless communication apparatus 2. The trigger frame indicates transmission time periods in which the wireless communication apparatuses 10 transmit data frames, respectively and frequency bandwidths that are used for the transmission of the data frames, respectively. The wireless communication apparatuses 10 transmit the data frames including the data in parallel by frequency-division multiplexing, to the wireless communication apparatus 2. The wireless communication apparatus 2 demultiplexes the multiplexed data frames into the data frames before the multiplexing, and confirms whether reception of each of the data frames is successful. If the wireless communication apparatus 2 has succeeded in reception of at least one of the data frames, the wireless communication apparatus 2 transmits an Ack frame as an acknowledgment frame, to the wireless communication apparatus that transmitted the at least one of the data frames.

Each of the wireless communication apparatuses 10 receives the Ack frame even if the destination of the Ack frame is not the own apparatus. Then, if the Address 1 field in the Ack frame indicates at least one of the wireless communication apparatuses 10, the wireless communication apparatuses 10 do not retransmit the data frames including the same data. This is because the wireless communication apparatus 2 has successfully received the data. In other words, if none of Ack frames for these wireless communication apparatuses 10 is transmitted from the wireless communication apparatus 2, the wireless communication apparatuses 10 determine that the wireless communication apparatus 2 has failed in the reception of all the data frames and retransmit the data frames including the same data.

If three or more wireless communication apparatuses 10 on the data transmission side are arranged, a variety of arrangements may be considered. Some of the wireless communication apparatuses 10 may be arranged in each of rows, the wireless communication apparatuses 10 may be arranged in a mesh, or the wireless communication apparatuses 10 may be arranged radially around one of the wireless communication apparatuses 10.

In a case where a wireless communication system includes three or more wireless communication apparatuses 10 that are arranged as the wireless communication apparatuses on the data transmission side, the wireless communication apparatuses 10 on the data transmission side may be classified into several groups. In this case, the wireless communication apparatuses 10 that belong to a group may transmit data frames including the same data, and data in a data frame transmitted from a wireless communication apparatus 10 that belongs to a group may be different from data in a data frame transmitted from a wireless communication apparatus 10 that belongs to another group.

For example, there is a wireless communication system shown in FIG. 11. That is, the data storage apparatus 1, the wireless communication apparatuses 10A, 10B, and 10C on the data transmission side, and the wireless communication apparatus 2 are provided. The configuration of the wireless communication apparatus 10C is the same as that of the wireless communication apparatus 10A, and includes an antenna 11C, a transmitter 12C, a receiver 13C, a frame forming unit 14C, and a retransmission determination unit 15C. In this case, a rule is assumed to be set that if the wireless communication apparatus 2 transmits a trigger frame, the wireless communication apparatuses 10A and 10B transmit data frames (A1 and B1 in FIG. 11) including the same data (data 1 in FIG. 11), and the wireless communication apparatuses 10B and 10C transmit data frames (B2 and C1 in FIG. 11) including the same data (data 2 in FIG. 11). The wireless communication apparatuses 10A and 10B receive the data 1 from the data storage apparatus 1, and the wireless communication apparatuses 10B and 10C receive the data 2 from the data storage apparatus 1. In this case, the wireless communication apparatuses 10A and 10B recognize that they transmit the same data to the wireless communication apparatus 2, and the wireless communication apparatuses 10B and 10C recognize that they transmit the same data to the wireless communication apparatus 2, by the means explained in the present embodiment. That is, the wireless communication apparatuses 10A and 10B recognize that the data 1 is the same data to be transmitted to the wireless communication apparatus 2, and the wireless communication apparatuses 10B and 10C recognize that the data 2 is the same data to be transmitted to the wireless communication apparatus 2.

The wireless communication apparatus 2 transmits a trigger frame to the wireless communication apparatuses 10A, 10B, and 10C. The wireless communication apparatuses 10A, 10B, and 10C transmit the data frames to the wireless communication apparatus 2, under the settings designated in the trigger frame.

In this case, as is the case with the present embodiment, the wireless communication apparatuses 10A and 10B transmit the data frames including the data 1 in parallel by frequency-division multiplexing. After a certain time from the transmission, the wireless communication apparatuses 10B and 10C transmit the data frames including the data 2 in parallel by frequency-division multiplexing. The trigger frame transmitted from the wireless communication apparatus 2 designates a transmission time of each of the data frames A1, B1, B2, and C1 and a frequency bandwidth used for the transmission of each frame.

In this case, since the wireless communication apparatuses 10A and 10B transmit the data frames in advance, they attach the same sequence number to the data frames A1 and B1. However, since the wireless communication apparatus 10B has already transmitted the data frame, the wireless communication apparatuses 10B and 10C may not attach the same sequence number to the data frames B2 and C1. In this case, a rule that the data 1 is included in the data frame having the smaller sequence number (B1 in FIG. 11) of the data frames transmitted from the wireless communication apparatus 10B is set in the wireless communication apparatuses 10A, 10B, and 10C. Therefore, the wireless communication apparatuses 10A, 10B and 10C can recognize the data frames that the wireless communication apparatus 2 has successfully received, based on the Block Ack frame transmitted from the wireless communication apparatus 2.

That is, the wireless communication apparatuses 10A, 10B, and 10C can recognize success or failure of the reception of the data frames A1 and B1 including the data 1, and success or failure of the reception of the data frames B2 and C1 including the data 2, by the wireless communication apparatus 2, by referring to the AID, the Address 2, the sequence number, the TID, and the like that are included in the Block Ack frame. Then, the wireless communication apparatuses 10A, 10B, and 10C are capable of retransmitting the only data frame including the data that the wireless communication apparatus 2 has failed in receiving.

Even if three or more wireless communication apparatuses on the data transmission side are provided, variation of the configuration and the operation described in relation to the wireless communication apparatuses 10A and 10B can be performed similarly.

According to the present embodiment, the wireless communication apparatus 10A that includes the retransmission determination unit 15A does not redundantly retransmit a frame of data that the wireless communication apparatus on the data reception side has already received successfully. Using the wireless communication channels regardless of unnecessity can be reduced, and a redundant use time of the wireless communication channels can be reduced while increasing the reliability of wireless communication in the overall wireless communication system. In a case where no data frame is retransmitted redundantly by the wireless communication apparatus 10A, since the wireless communication apparatus 2 does not need to receive any redundant data frame, the power consumed in the wireless communication system can be saved. In a case where the wireless communication apparatuses 10A transmit data frames in parallel by multiplexing, the use time of the wireless communication channels is made shorter. Therefore, the reliability of wireless communication can be increased while achieving lower delay and power saving.

Second Embodiment

FIG. 12 is a system diagram of a wireless communication apparatus according to a second embodiment. In the second embodiment, multiple wireless communication apparatuses transmitting data frames may have a retransmission control function similar to the conventional function since an apparatus receiving the same data from the multiple wireless communication apparatuses is modified.

A wireless communication system of the present embodiment is similar to the system including the wireless communication apparatuses of the first embodiment shown in FIG. 1. However, wireless communication apparatuses on the data transmission side (i.e., two wireless communication apparatuses 3A and 3B in FIG. 12) have configurations that are simpler than the retransmission determination unit 15A explained in the first embodiment. For example, a retransmission control unit 15a (not shown) may be configured to perform the conventional determination of not retransmitting a data frame including the same data in accordance with reception of an acknowledgment frame for the own apparatus. That is, each of the wireless communication apparatuses 3A and 3B performs the determination of not retransmitting a data frame when receiving an acknowledgment frame for the own apparatus, and perform the determination of retransmitting a data frame when receiving an acknowledgment frame for the other wireless communication apparatus.

In addition, the system is different from the system in FIG. 1 with respect to a feature that a wireless communication apparatus (20 in FIG. 12) on the data reception side includes an acknowledgment frame control unit. The acknowledgment frame control unit issues an instruction to form and transmit acknowledgment frames to the wireless communication apparatuses 3A and 3B if reception of at least one of data frames that include the same data and are transmitted from the wireless communication apparatuses 3A and 3B, respectively, is successful. The connection environment of the system and the used frames are the same as those of the first embodiment, and their explanations will be therefore omitted.

FIG. 13 is a configuration example of the wireless communication apparatus 20 of the second embodiment. An antenna 21, a transmitter 22, a receiver 23, and a frame forming unit 24 that are provided in the wireless communication apparatus 20 are the same as the antenna 11A, the transmitter 12A, the receiver 13A, and the frame forming unit 14A of the wireless communication apparatus 10A of the first embodiment, and their explanations will be therefore omitted.

The frame forming unit 24 forms a trigger frame to instruct wireless communication apparatuses on the data transmission side to transmit data, and instructs the transmitter 22 to transmit the trigger frame. In the present embodiment, the frame forming unit 24 forms a trigger frame to instruct the wireless communication apparatuses 3A and 3B to transmit the same data, and instructs the transmitter 22 to transmit the trigger frame. The frame forming unit 24 may have a list of the wireless communication apparatuses, which transmit the same data, in advance or may acquire information of the wireless communication apparatuses, which transmit the same data, from the other wireless communication apparatus.

The receiver 23 receives a data frame A1 that is transmitted from the wireless communication apparatus 3A in accordance with the trigger frame and a data frame B1 that is transmitted from the wireless communication apparatus B3 in accordance with the trigger frame. The data frames A1 and B1 include the same data. The receiver 23 notifies the acknowledgment frame control unit 26 of success of the reception if the reception of any one of the data frames is successful.

If the receiver 23 has succeeded in the reception of at least one of data frames that include the same data and are transmitted from the wireless communication apparatuses on the transmission side, the acknowledgment frame control unit 26 issues an instruction to form and transmit acknowledgment frames to all the wireless communication apparatuses that have transmitted the data frames including the same data.

If the receiver 23 has succeeded in the reception of at least one of data frames that include the same data and are transmitted from the wireless communication apparatuses on the transmission side, but if the receiver 23 has failed in the reception of the other data frames including the same data, the acknowledgment frame control unit 26 instructs the frame forming unit 24 to form acknowledgment frames for not only the wireless communication apparatus of the sender of the at least one data frame which has been received successfully by the receiver 23, but also the wireless communication apparatuses that has transmitted the other data frames, and instructs the transmitter 22 to transmit the acknowledgment frames.

The instruction to form the acknowledgment frames is performed when, for example, the receiver 23 has succeeded in the reception of the first data frame of the data frames that include the same data. If the receiver 23 receives the other data frames that include the same data after the acknowledgment frame control unit 26 issues the instruction, the acknowledgment frame control unit 26 does not issue any instruction to form acknowledgment frames. In addition, when the receiver 23 has succeeded in reception of all data frames that include the same data, the acknowledgment frame control unit 26 instructs the frame forming unit 24 to form acknowledgment frames for all the wireless communication apparatuses that are the senders of the data frames, and instructs the transmitter 22 to transmit the acknowledgment frames.

FIG. 14 illustrates a sequence diagram of the wireless communication system of the second embodiment. The operations of the wireless communication system including the data storage apparatus 1, the wireless communication apparatuses 3A and 33, and the wireless communication apparatus 20, in the second embodiment, will be described with reference to FIG. 14. It will be explained below a case where, in the present embodiment, the wireless communication apparatuses 3A and 3B transmit data frames in parallel by frequency-division multiplexing. Note that the wireless communication apparatus 20 may transmit multiple acknowledgement frames at different times, transmit acknowledgement frames in parallel by frequency-division multiplexing, transmit a Block ACK frame (shown in FIG. 7) that contains acknowledgement information of the wireless communication apparatus 3A and acknowledgement information of the wireless communication apparatus 3B, or the like. It will be explained below a case where the wireless communication apparatus 20 transmits acknowledgment frames in parallel by frequency multiplexing. In the present embodiment, similarly to the first embodiment, the wireless communication apparatuses 3A and 3B recognize that they transmit the same data to the wireless communication apparatus 20, by the means explained in the first embodiment. Furthermore, a rule that the wireless communication apparatuses 3A and 3B, which have received the trigger frame, transmit data frames including the same data to the wireless communication apparatus 20 is set, and the time has been adjusted in the wireless communication apparatuses 20, 3A and 3B.

The operations from the time when the wireless communication apparatuses 3A and 3B receive the same data from the data storage apparatus 1 until the time when the wireless communication apparatus 20 performs error detection to determine whether an error occur in each of the data frames A1 and B1 transmitted from the wireless communication apparatuses 3A and 3B are the same as those of the first embodiment excerpt several operations. The wireless communication apparatuses 10A and 10B are replaced with the wireless communication apparatuses 3A and 3B, and the wireless communication apparatus 2 is replaced with the wireless communication apparatus 20, and their explanations will be therefore omitted. As partial difference, the wireless communication apparatus 20 may transmit multiple trigger frames in parallel by frequency-division multiplexing, to the wireless communication apparatuses 3A and 3B.

If the wireless communication apparatus 20 has succeeded in the reception of the two data frames as a result of detecting an error of the data frames, the wireless communication apparatus 20 transmits Ack frames to the wireless communication apparatuses 3A and 3B as acknowledgment frames. The Ack frames are transmitted in parallel by frequency-division multiplexing.

If the wireless communication apparatus 20 has succeeded in the reception of only the data frame A1, the wireless communication apparatus 20 determines that the reception of the data frames A1 and B1 is successful since the wireless communication apparatus 20 recognizes that the data frame B1 including the same data is transmitted from the wireless communication apparatus 3B. The wireless communication apparatus 20 forms and transmits Ack frames to not only the wireless communication apparatus 3A, but also the wireless communication apparatus 3B. The Ack frames are transmitted in parallel by frequency-division multiplexing.

If the wireless communication apparatus 20 has succeeded in the reception of only the data frame B1, the wireless communication apparatus 20 determines that the reception of the data frames A1 and B1 is successful since the wireless communication apparatus 20 recognizes that the data frame A1 including the same data is transmitted from the wireless communication apparatus 3A. The wireless communication apparatus 20 forms Ack frames not only for the wireless communication apparatus 3B, but also for the wireless communication apparatus 3A and transmits the Ack frames. The Ack frames are transmitted in parallel by frequency-division multiplexing. If the wireless communication apparatus 20 has failed in reception of the two data frames, the wireless communication apparatus 20 does not transmit Ack frames.

If the wireless communication apparatus 20 transmits Ack frames, each of the wireless communication apparatuses 3A and 3B receives the only a frame whose destination is the own apparatus, recognizes that the wireless communication apparatus 20 has received the data transmitted from the own apparatus, and does not retransmit the data frame including the data. Each of the wireless communication apparatuses 3A and 3B retransmits the data frame to the wireless communication apparatus 2 if the wireless communication apparatus 20 has failed in the reception of both of the two data frames from the wireless communication apparatuses 3A and 3B.

Figure 15:
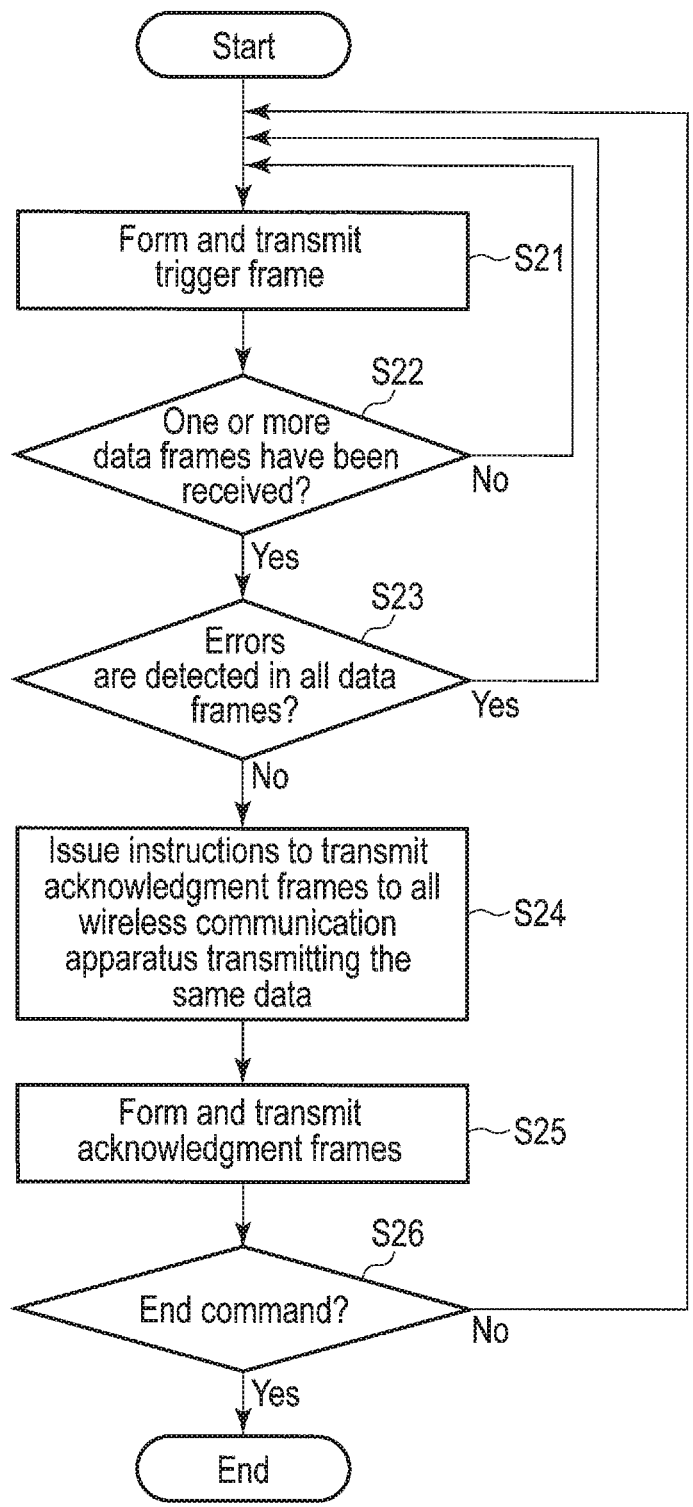
FIG. 15 is a flowchart illustrating an operation by the electronic apparatus of the second embodiment.

FIG. 15 is a flowchart illustrating an operation by the wireless communication apparatus 20 of the second embodiment. An operation of the wireless communication apparatus 20 of the present embodiment will be explained with reference to FIG. 15. It is assumed that the wireless communication apparatuses on the data transmission side have already stored the same data and complete the time adjustment. In the present embodiment, the wireless communication apparatuses 3A and 3B recognize that data transmitted from them to the wireless communication apparatus 20 are the same, by the means explained in the first embodiment.

First, the frame forming unit 24 forms a trigger frame, and the transmitter 22 transmits the trigger frame to the wireless communication apparatuses on the data transmission side (step S21). Note that the frame forming unit 24 may form multiple trigger frames, and the transmitter 22 may transmit the trigger frames to the wireless communication apparatuses on the data transmission side, respectively. The transmitter 22 may transmit the trigger frames in parallel by frequency-division multiplexing, space division multiplexing, code multiplexing, or orthogonal frequency-division multiplexing. Alternatively, the transmitter 22 may not perform the parallel (simultaneous) transmission but perform partial multiplexing by shifting the transmission time.

Each of the wireless communication apparatuses on the data transmission side, which has received the trigger frame, forms a data frame including the same data, and transmits the data frame by settings designated by the trigger frame as explained in the first embodiment.

Next, the receiver 23 attempts reception of the data frames for a certain time (step S22). If the receiver 23 has not received any one of the data frames in the certain time (step S22: No), the receiver 23 determines that the reception of the data is unsuccessful, and the flow returns to step S21 to form and transmit a trigger frame for the wireless communication apparatuses on the data transmission side after a specific time.

In contrast, if the receiver 23 has received at least one of the data frames in the certain time (step S22: Yes), the receiver 23 performs error detection using a CRC, etc., to determine that the reception of the data frame is successful (step S23). If errors are detected in all of the received data frames, i.e., if the receiver 23 has failed in the reception of all the data frames (step S23: Yes), the receiver 23 determines that the reception of the data is unsuccessful, and the flow returns to step S21 to form and transmit a trigger frame for the wireless communication apparatuses on the data transmission side after a specific time.

In contrast, if any error has not been detected in at least one data frame, of all the received data frames, i.e., if the receiver 23 has succeeded in the reception of at least one of the data frames (step S23: No), the receiver 23 determines that the reception of the data is successful. The acknowledgment frame control unit 26 instructs the frame forming unit 24 to form acknowledgment frames not only for the wireless communication apparatuses, which are the senders of the data frames that have been successfully received, but also for all the wireless communication apparatuses that has transmitted the data frames including the data, and instructs the transmitter 22 to transmit the acknowledgment frames (step S24). That is, even if the receiver 23 has succeeded in the reception of at least one data frame and has failed in the reception of the other data frames including the data, the acknowledgment frame control unit 26 instructs the frame forming unit 24 to form acknowledgment frames for the wireless communication apparatuses that are the senders of the other data frames, and instructs the transmitter 22 to transmit the acknowledgment frames.

After step S24, the frame forming unit 24 forms acknowledgment frames for all the wireless communication apparatuses that have transmitted the data frames including the same data, and the transmitter 22 transmits these acknowledgment frames (step S25). The acknowledgment frames may be Ack frames or may be a Block Ack frame. In the present embodiment, the transmitter 22 transmits the Ack frames in parallel by frequency-division multiplexing, but may use space division multiplexing, code multiplexing, and orthogonal frequency-division multiplexing instead of the frequency-division multiplexing. Alternatively, the transmitter 22 may not perform the parallel (simultaneous) transmission but perform partial multiplexing by shifting the transmission time.

After step S25, the wireless communication apparatus 10A confirms whether the user's end command has been received (step S26). The wireless communication apparatus 10A acquires the end command as an input operation for the wireless communication apparatus 20 by the user or as a signal including the end command received by the receiver 23. If the end command is not confirmed, the flow returns to step S21. If the end command is confirmed, the flow ends. The wireless communication apparatus 20 may immediately end the operation in accordance with this end command.

Table 2 is a table showing the success or failure of reception of each of the data frames in the present embodiment. More specifically, with regard to two data frames A1 and B1 that include the same data and are transmitted from the wireless communication apparatuses 3A and 3B on the data transmission side, respectively, the table shows the success or failure of reception of each of the data frame A1 and the data frame B1 by the receiver 23, and the success or failure of reception of the data. Note that the wireless communication apparatus 20 transmits a trigger frame to the wireless communication apparatuses 3A and 3B and receives the data frames including the same data from the wireless communication apparatuses 3A and 3B.

TABLE 2

| Success or failure of reception of data frame A1 | Success or failure of reception of data frame B1 | Success or failure of data reception by wireless communication device 20 |
|---|---|---|
| Success | Success | Success |
| Failure | Success | Success |
| Success | Failure | Success |
| Failure | Failure | Failure |

If the receiver 23 has succeeded in the reception of both of the two data frames transmitted from the wireless communication apparatuses 3A and 3B (Table 2: the second row from the top), the receiver 23 has succeeded in the reception of the data. The acknowledgment frame control unit 26 instructs the frame forming unit 24 to form Ack frames for the wireless communication apparatuses 3A and 3B and instructs the transmitter 22 to transmit the Ack frames. The frame forming unit 24 forms Ack frames, and the transmitter 22 transmits the Ack frames in parallel by frequency-division multiplexing.

If the receiver 23 has failed in the reception of the data frame A1 and has succeeded in the reception of the data frame B1 (Table 2: the third row from the top), the receiver 23 has succeeded in the reception of the data. The acknowledgment frame control unit 26 instructs the frame forming unit 24 to form Ack frames for not only the wireless communication apparatus 3B but also the wireless communication apparatus 3A, and instructs the transmitter 22 to transmit the Ack frames. The frame forming unit 24 forms Ack frames, and the transmitter 22 transmits the Ack frames in parallel by frequency-division multiplexing.

If the receiver 23 has succeeded in the reception of the data frame A1 and has failed in the reception of the data frame B1 (Table 2: the fourth row from the top), the receiver 23 has succeeded in the reception of the data. The acknowledgment frame control unit 26 instructs the frame forming unit 24 to form Ack frames for not only the wireless communication apparatus 3A but also the wireless communication apparatus 3B, and instructs the transmitter 22 to transmit the Ack frames. The frame forming unit 24 forms Ack frames, and the transmitter 22 transmits the Ack frames in parallel by frequency-division multiplexing.

If the receiver 23 has failed in the reception of both of the two data frames transmitted from the wireless communication apparatuses 3A and 3B (Table 2: the fifth row from the top), the receiver 23 has failed in the reception of the data. After a certain time, the frame forming unit 24 forms a trigger frame and the transmitter 22 transmits the trigger frame to the wireless communication apparatuses 3A and 3B in parallel by frequency-division multiplexing.

The present embodiment has been described above, and modified examples may be variously performed. All the modified examples of the wireless communication apparatuses 10A and 10B explained in the first embodiment may be applied to the wireless communication apparatuses 3A and 3B with the exception of the modified examples related to the retransmission determination units 15A and 15B. Since all the modified examples corresponding to the wireless communication apparatus 2 explained in the first embodiment may be applied to the wireless communication apparatus 20, explanations of the modified examples will be omitted in the present embodiment.

In the modified example of the configuration in the wireless communication apparatus 20, the retransmission determination unit 15A in the wireless communication apparatus 10A is merely replaced with the acknowledgment frame control unit 26, and the other components, i.e., the antenna, the transmitter, the receiver, and the frame forming unit are the same as those of the wireless communication apparatus 10A. Therefore, the modified examples of the configuration are the same and have been explained in the first embodiment, and will be omitted. In addition, the retransmission determination unit 15A of the first embodiment may be incorporated into the wireless communication apparatus 20. That is, the wireless communication apparatus 20 may be a wireless communication apparatus including the antenna 21, the transmitter 22, the receiver 23, the frame forming unit 24, a retransmission determination unit 25, and the acknowledgment frame control unit 26. The retransmission determination unit 25 is the same as the retransmission determination unit 15A of the wireless communication apparatus 10A explained in the first embodiment.

The modified example of the operation by the wireless communication apparatus 20 may be variously performed. For example, in the present embodiment, the wireless communication apparatus 20 causes the wireless communication apparatuses 3A and 3B to transmit data frames including the same data by transmitting a trigger frame. However, the wireless communication apparatuses 3A and 3B may transmit the data frames without transmitting the trigger frame from the wireless communication apparatus 20 to the wireless communication apparatuses 3A and 3B as explained in the modified example of the first embodiment. In this case, in the flow shown in FIG. 15, the wireless communication apparatus 20 skips step S21 of transmitting a trigger frame, and performs step S22 of attempting reception of data frames.

Table 3 shows a table indicative of success or failure of reception of each of data frames in this case. In the present embodiment, failure in reception is indicative of a case where the reception of a data frame transmitted from the wireless communication apparatus on the data transmission side is unsuccessful and a case where the received data frame includes an error. In this modified example, un-reception is indicative of a case where the wireless communication apparatus 20 has not received a data frame, and the failure in reception is indicative of a case where the received data frame includes an error. Since the wireless communication apparatus 20 does not transmit a trigger frame to the wireless communication apparatuses 3A and 3B, the wireless communication apparatus 20 does not preliminarily recognize the time in which data frames may be transmitted, and thus, the un-reception and the failure in reception are used. If the receiver 23 has failed in reception of one of the data frames or has not received one of the data frames but has succeeded in reception of the other of the data frames, the acknowledgment frame control unit 26 may instruct the frame forming unit 24 to form acknowledgment frames for not only the sender of the data frame that has been successfully received by the receiver 23, but also the sender of the data frame that has been received unsuccessfully or has not been received yet, and may instruct the transmitter 22 to transmit the acknowledgment frames.

In addition, in the modified example, the transmission times of the data frames are unknown, but a rule that the wireless communication apparatuses 3A and 3B transmit data frames including the same data is set in the wireless communication apparatuses 20, 3A and 3B. In addition, the wireless communication apparatuses 3A and 3B have already stored the same data.

TABLE 3

| Success or failure of reception of data frame A1 | Success or failure of reception of data frame B1 | Success or failure of data reception by wireless communication device 20 |
| --- | --- | --- |
| Success | Success | Success |
| Failure | Success | Success |
| Unreceived | Success | Success |
| Success | Failure | Success |
| Failure | Failure | Failure |
| Unreceived | Failure | Failure |
| Success | Unreceived | Success |
| Failure | Unreceived | Failure |
| Unreceived | Unreceived | Unreceived |

The case where the receiver 23 has succeeded in reception of both of two data frames transmitted from the wireless communication apparatuses 3A and 3B (Table 3: the second row from the top), the case where the receiver 23 has succeeded in reception of one of the data frames and has failed in the reception of the other data frame (Table 3: the third and fifth rows from the top), and the case where the receiver 23 has failed in reception of the two data frames (Table 3: the sixth row from the top) correspond to the cases of the second to fifth rows from the top in Table 2, and their explanations will be therefore omitted.

If the receiver 23 has not received the data frame A1 and has succeeded in the reception of the data frame B1 (Table 3: the fourth row from the top), the receiver 23 determines that the wireless communication apparatus 3A will also transmit the data frame A1 including the same data, based on the rule. Since the receiver 23 has succeeded in the reception of the data, the acknowledgment frame control unit 26 instructs the frame forming unit 24 to form Ack frames for not only the wireless communication apparatus 3B but also the wireless communication apparatus 3A, and instructs the transmitter 22 to transmit the Ack frames. The frame forming unit 24 forms Ack frames, and the transmitter 22 transmits the Ack frames in parallel by frequency-division multiplexing.

If the receiver 23 has succeeded in the reception of the data frame A1 and has not received the data frame B1 yet (Table 3: the eighth row from the top), the wireless communication apparatuses 3A and 3B are merely replaced each other from the case of the fourth row from the top in Table 3, and the explanation will be therefore omitted.

If the receiver 23 has not received the data frame A1 yet and has failed in the reception of the data frame B1 (Table 3: the seventh row from the top), the receiver 23 does not transmit any Ack frame since the receiver 23 has failed in the reception of the data. In this case, since the wireless communication apparatus 20 does not use a trigger frame, the receiver 23 continuously attempts reception of the data frames.

If the receiver 23 has failed in the reception of the data frame A1 and has not received the data frame B1 yet (Table 3: the ninth row from the top), the wireless communication apparatuses 3A and 3B are merely replaced each other from the case of the seventh row from the top in Table 3, and their explanations will be therefore omitted.

If the receiver 23 has not received the two data frames transmitted from the wireless communication apparatuses 3A and 3B yet (Table 3: the tenth row from the top), the receiver 23 continuously attempts reception of the data frames since there is no data frame for the receiver 23.

In this modified example, any trigger frame may not be used or, if the receiver 23 has failed in the reception of the data or if the wireless communication apparatus 20 instructs the wireless communication apparatuses 3A and 3B to retransmit the data frames including the data, a trigger frame may be used.

In addition, in this modified example, a rule that if the wireless communication apparatus 20 receives a first data frame from one of the wireless communication apparatuses 3A and 3B and the wireless communication apparatus 20 receives a second data frame from the other within a certain time after the first data frame is received, these two data frames may include the same data, may be further set.

In addition, in the present embodiment, the wireless communication apparatus 20 uses Ack frames as the acknowledgment frames, but may perform the acknowledgment by using a Block Ack frame. The wireless communication apparatus 20 can notify the wireless communication apparatuses 3A and 3B of pieces of information indicative of the success or failure of reception of the data frames transmitted from the wireless communication apparatuses 3A and 3B, respectively, by transmitting a Block ACK frame that is shown in FIG. 7 and contains these pieces of information. The wireless communication apparatus 20 may transmit a Block ACK frame that contains, for example, the Per STA Info1 field in which the acknowledgement information for the wireless communication apparatuses 3A and the Per STA Info2 field in which the acknowledgement information for the wireless communication apparatuses 3B.

For example, it is assumed a case where the wireless communication apparatuses 3A and 3B transmit eight data frames A1, A2, A3, A4, B1, B2, B3, and B4 to transmit four pieces of data 1, 2, 3, and 4, similarly to FIG. 10 explained in the first embodiment. The success or failure of the reception of each data frame is can be recognized in the same manner as that shown in FIG. 10, and will be omitted.

The explanations different from those in the first embodiment relate to the process for the data frame A2. Since the receiver 23 has failed in the reception of the data frame A2 but has succeeded in the reception of the data frame B2, the receiver 23 has succeeded in the reception of the data 2. In this case, the acknowledgment frame control unit 26 instructs the frame forming unit 24 to form a Block Ack frame to notify that the reception of not only the data frame B2 but also the data frame A2 is successful, and instructs the transmitter 22 to transmit the Block Ack frame. The frame forming unit 24 may form a Block Ack frame for the wireless communication apparatuses 3A and 3B at once to notify that the reception of the data frames A1, A2, A4, B1, B2, and B4 is successful, and the transmitter 22 may transmit the Block Ack frame.

In addition, in this case, the data 1 to data 4 in FIG. 10 may be replaced with divisional data of the data 1, i.e., the data 1a to 1d as explained in the first embodiment. A rule for dividing the data 1 into the data 1a, the data 1b, the data 1c, and the data 1d needs to be set in the wireless communication apparatuses 3A and 3B.

In the present embodiment, a rule that the wireless communication apparatuses 3A and 3B transmit the data frames including the same data is set. However, if each of the wireless communication apparatuses 3A and 3B transmits a data frame including the same data and a data frame including a different data, the receiver 23 may determine whether a received data is the same data or the different data and change the processing for each received data. In this case, the wireless communication apparatuses 3A and 3B recognize that data transmitted to the wireless communication apparatus 20 is the same data or the different data, by the means explained in the first embodiment.

For example, as shown in FIG. 16, the wireless communication apparatus 3A transmits a data frame A1 including data 1 and a data frame A2 including data 2 to the wireless communication apparatus 20, and the wireless communication apparatus 3B transmits a data frame B1 including the data 1 and a data frame B2 including data 3 to the wireless communication apparatus 20.

As means for the receiver 23 for determining whether received data is the same data, a rule that the same sequence number should be attached to the data frames including the same data may be set in the wireless communication apparatuses 20, 3A, and 3B. Then, the receiver 23 may determine whether received data is the same data by referring to the TID and the sequence number of a data frame or may determine whether received data is the same data by acquiring information for the determination from an upper layer of the wireless communication apparatus 20. Hereinafter, a case where a sequence number is used for data frames including the same data will be explained.

As shown in FIG. 16, the receiver 23 receives the data frames A1, A2, B1, and B2 from the wireless communication apparatuses 3A and 3B. The same sequence number is attached to the data frames A1 and B1 of these data frames. If the receiver 23 has succeeded in the reception of the data frames A1 and has failed in the reception of the data frame B1, and recognizes that the sequence number of the data frame A1 is the same as the sequence number of the data frame B1, the wireless communication apparatus 20 has succeeded in the reception of the data 1. Therefore, the acknowledgment frame control unit 26 instructs the frame forming unit 24 to form Ack frames for not only the wireless communication apparatus 3A, but also the wireless communication apparatus 3B and instructs the transmitter 22 to transmit the Ack frames. In contrast, the receiver 23 recognizes that the data in the data frame A2 is different from the data in the data frame B2. The acknowledgment frame control unit 26 instructs the frame forming unit 24 to form Ack frames and instructs the transmitter 22 to transmit the Ack frames, in accordance with the success or failure of each of the reception of the data frame A2 and the reception of the data frame B2.

The frame forming unit 24 forms Ack frames, and the transmitter 22 transmits the Ack frames in parallel by frequency-division multiplexing. For example, if the receiver 23 has succeeded in the reception of the data frames A1, A2, and B2 and has failed in the reception of the data frame B1, the acknowledgment frame control unit 26 instructs the frame forming unit 24 to form two Ack frames for each of the wireless communication apparatus 3A and the wireless communication apparatus 3B, and instructs the transmitter 22 to transmit the Ack frames. The frame forming unit 24 forms the Ack frames, and the transmitter 22 transmits the Ack frames in parallel by frequency-division multiplexing.

If the wireless communication apparatus 20 uses a Block Ack frame as the acknowledgment frame, the wireless communication apparatus 20 may perform acknowledgment for the data frames to the wireless communication apparatuses 3A and 3B at once. For example, if the wireless communication apparatus 20 has succeeded in the reception of the data frames A1, A2, B1, and B2, the wireless communication apparatus 20 may transmit a Block Ack frame to the wireless communication apparatuses 3A and 3B to notify them of success of the reception of the data frames A1, A2, B1, and B2.

Figure 17:
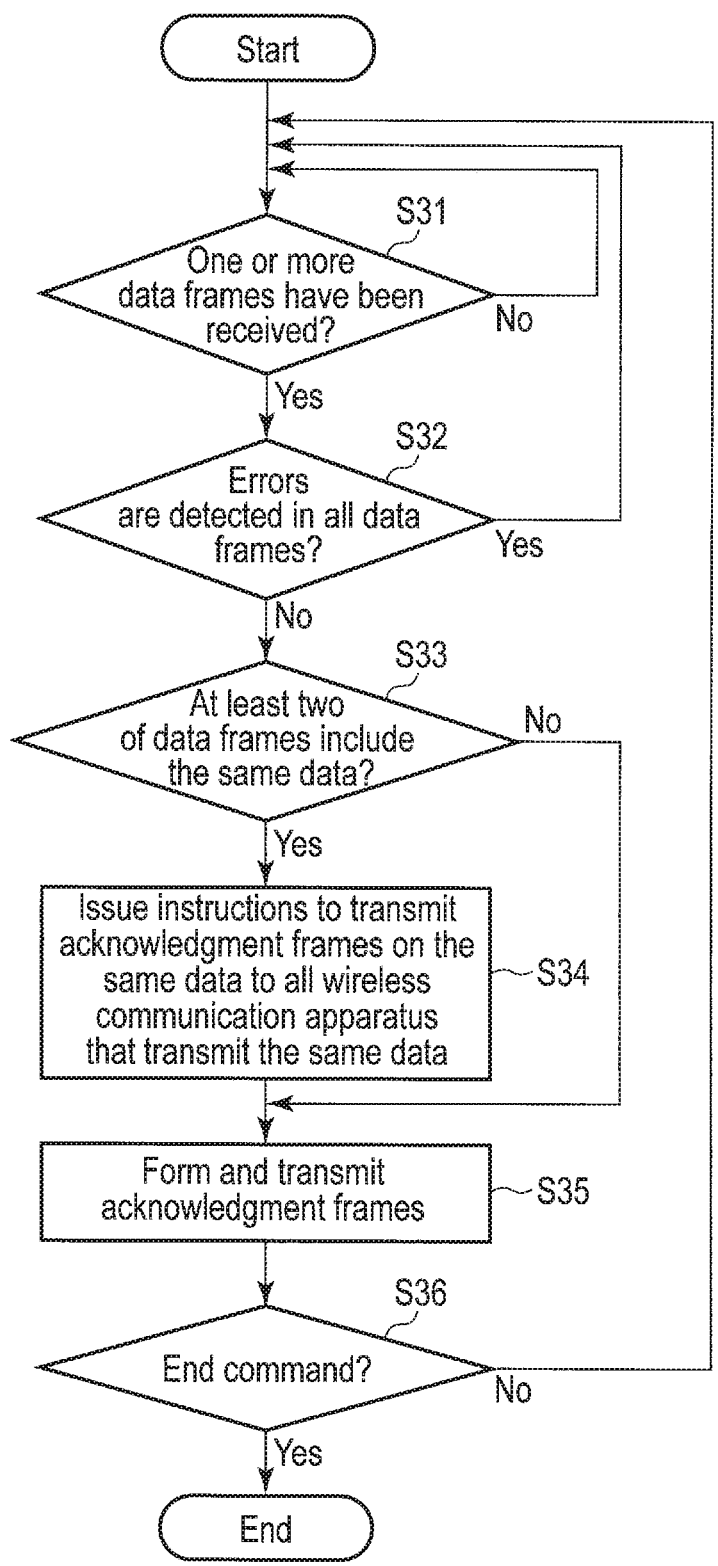
FIG. 17 is a flowchart illustrating an operation by the electronic apparatus that determines whether pieces of data are the same.

FIG. 17 shows a flow of the wireless communication apparatus 20 in this case. Operations by the wireless communication apparatus 20 will be explained while explaining differences from FIG. 15 illustrating the flow of the wireless communication apparatus 20 in the present embodiment. The flow of FIG. 17 illustrates a case where the wireless communication apparatus 20 does not transmit any trigger frame to the wireless communication apparatuses 3A and 3B, but the wireless communication apparatus 20 may be configured to transmit a trigger frame. It is assumed that the wireless communication apparatus 3A has received the data 1 and the data 2 from the data storage apparatus 1, that the wireless communication apparatus 3B has received the data 1 and the data 3 from the data storage apparatus 1, and that the wireless communication apparatuses 3A and 3B recognize that the data 1 is the same data, by the means explained in the first embodiment.

Steps S31 and S32 correspond to steps S22 and S23 in FIG. 15, and their explanations will be therefore omitted. If it is determined the case in step S32: No, the receiver 23 determines whether each of the data frames includes the same data (step S33). As means for the receiver 23 for determining whether a data frame includes the same data, a rule that the same sequence number should be attached to data frames including the same data may be set in the wireless communication apparatuses 20, 3A, and 3B, and then the receiver 23 may determine whether a data frame includes the same data by referring to the Address 2, the AID, the sequence number, the TID, etc., of the data frame. Alternatively, the receiver 23 may determine whether a data frame includes the same data by acquiring information for the determination from an upper layer of the wireless communication apparatus 20.

If the receiver 23 determines that the received data frames include multiple data frames that contain the same data (step S33: Yes), the acknowledgment frame control unit 26 instructs the frame forming unit 24 to form acknowledgment frames for all the wireless communication apparatuses that are the senders of the multiple data frames, and instructs the transmitter 22 to transmit the acknowledgment frames (step S34). Note that if the received data frames include multiple data frames that contain the different data, the acknowledgment frame control unit 26 instructs the frame forming unit 24 to form an acknowledgment frame for each of the wireless communication apparatuses that are the senders of the multiple data frames, and instructs the transmitter 22 to transmit the acknowledgment frames. After that, the flow proceeds to step S35.

In contrast, if the receiver 23 determines that none of the received data frames contain the same data, i.e., if data in the received data frames is different each other (step S33: No), the acknowledgment frame control unit 26 instructs the frame forming unit 24 to form an acknowledgment frame for each of the wireless communication apparatuses that are the sender of the data frames, and instructs the transmitter 22 to transmit the acknowledgment frames. After that, the flow proceeds to step S35.

Steps S35 and S36 correspond to steps S25 and S26 in FIG. 15, and their explanations will be therefore omitted.

The flow of FIG. 17 illustrates a case where the wireless communication apparatus 20 does not transmit a trigger frame to the wireless communication apparatuses 3A and 3B, but the wireless communication apparatus 20 may be configured to transmit a trigger frame.

In the present embodiment, the wireless communication apparatuses 3A and 33 on the data transmission side are wireless communication apparatuses including the retransmission control function similar to the conventional function, but the wireless communication apparatus 10A explained in the first embodiment may be employed instead. By employing the wireless communication apparatus 10A, the wireless communication apparatuses on the data transmission side can also be set not to retransmit data, in a specific case, in the above-explained system of FIG. 16. In the system diagram of FIG. 16, the wireless communication apparatuses on the transmission side are merely replaced with the wireless communication apparatuses 10A and 10B, and their explanations will be therefore omitted. In this case, the wireless communication apparatus 20 uses a Block Ack frame as the acknowledgment frame.

The specific case is indicative of a case where the wireless communication apparatus 20 has not received one of the data frames A1 and B1 shown in FIG. 16, or has received the data frames but cannot determine that the data frames contain the same data. For example, there is a case where the wireless communication apparatus 20 has succeeded in the reception of the data frames A1, A2, and B2 but has not received the data frame B1 yet.

In this case, the receiver 23 determines that the data frames A1, A2, and B2 do not contain the same data. The acknowledgment frame control unit 26 instructs the frame forming unit 24 to form a Block Ack frame for the wireless communication apparatuses 10A and 10B and instructs the transmitter 22 to transmit the Block Ack frame. The Block Ack frame includes information that the reception of the data frames A1, A2, and B2 is successful. The frame forming unit 24 forms the Block Ack frame, and the transmitter 22 transmits the Block Ack frame.

The receiver 13A receives the Block Ack frame. The retransmission determination unit 15A determines that the retransmission of the data frames A1 and A2 may not be performed.

The receiver 13B receives the Block Ack frame. Since the retransmission determination unit 15B recognizes, based on the Block Ack frame, that the wireless communication apparatus 20 has not received the data frame B1 but the wireless communication apparatus 20 has received the data frame A1 including the same data 1, the retransmission determination unit 15B determines that the wireless communication apparatus 20 has received the data 1. The retransmission determination unit 15B therefore determines that the retransmission of the data frame B1 may not be performed. In addition, the retransmission determination unit 15B also determines that the data frame B2 may not be retransmitted, based on the Block Ack frame.

That is, even if the wireless communication apparatus 20 cannot receive a part of the data frames from the wireless communication apparatuses on the data transmission side and cannot determine that the data frames contain the same data, by employing the wireless communication apparatuses 10A and 10B as the wireless communication apparatuses on the data transmission side, the wireless communication apparatuses 10A and 10B can perform the determination based on the Block Ack frame to prevent retransmission of the data frames.

The wireless communication apparatuses 10A may be employed as some of the wireless communication apparatuses on the data transmission side, and wireless communication apparatuses including the retransmission control function similar to the conventional function may be employed as the others. For example, the wireless communication apparatus 10A and the wireless communication apparatus 3B having the retransmission control function similar to the conventional function may be employed as the wireless communication apparatuses on the data transmission side. Similarly to this case, however, although the wireless communication apparatus 20 cannot receive at least one of the data frames from the wireless communication apparatuses on the data transmission side and cannot determine that the received data frames contain the same data, the wireless communication apparatus 10A including the retransmission determination unit 15A can perform the determination based on the Block Ack frame to prevent the retransmission of the data frame including the same data. The wireless communication apparatus 3B, which includes the only retransmission control function similar to the conventional function, cannot prevent the retransmission of the data frame including the same data based on the Block Ack frame. Therefore, the effect that the wireless communication apparatus on the data transmission side does not perform data retransmission can be exerted if the wireless communication apparatus 10A is employed as the wireless communication apparatus on the data transmission side in this case.

In the present embodiment, the two wireless communication apparatuses 3A and 3B on the data transmission side are provided, but three or more wireless communication apparatuses may be provided. If three or more wireless communication apparatuses on the data transmission side are provided, the operations that are similar to those of the present embodiment may be performed and the effect can be exerted similarly to the present embodiment.

A case where the wireless communication apparatuses on the transmission side transmit data frames in parallel by frequency-division multiplexing, similarly to the present embodiment, will be explained below. A rule that the wireless communication apparatuses on the transmission side, which have received the trigger frame from the wireless communication apparatus 20, transmit data frames including the same data to the wireless communication apparatus 20 is set, and the time has been adjusted in the wireless communication apparatus 20 and the wireless communication apparatuses on the transmission side.

The operations from the time when the wireless communication apparatuses on the data transmission side receive data frames including the same data from the data storage apparatus 1 to the time when data frames are transmitted to the wireless communication apparatus 20 are the same as the operations explained in the first embodiment, and their explanations will be therefore omitted.

When the receiver 23 receives the multiplexed data frames from the wireless communication apparatuses on the data transmission side, the receiver 23 demultiplexes the received data frames into data frames before the multiplexing. The receiver 23 detects an error in each frame by using a CRC or the like to determine whether each of these data frames includes an error. The wireless communication apparatus 20 recognizes that these data frames contain the same data, based on the rule. If the receiver 23 has succeeded in the reception of any one of the data frames, the acknowledgment frame control unit 26 instructs the frame forming unit 24 to form Ack frames for not only the sender of the data frame that has been successfully received, but also the senders of the other data frames containing the same data, and instructs the transmitter 22 to transmit the Ack frames. The frame forming unit 24 forms the Ack frames, and the transmitter 22 transmits the Ack frames. That is, the wireless communication apparatus 20 transmits the Ack frames to not only the wireless communication apparatuses transmitting the data frame that has been successfully received, but also all the wireless communication apparatuses on the data transmission side that have transmitted the same data.

The wireless communication apparatuses on the data transmission side may be variously arranged as explained in the first embodiment. In addition, as explained in FIG. 11 of the first embodiment, the wireless communication system may be configured such that the wireless communication apparatuses on the data transmission side may be classified into several groups. In this case, the wireless communication apparatuses that belong to a group may transmit data frames containing the same data, and data in a data frame transmitted from a wireless communication apparatus that belongs to a group may be different from data in a data frame transmitted from a wireless communication apparatus that belongs to another group. As explained with reference to FIG. 16 and FIG. 17, the wireless communication apparatus 20 may determine whether a data frame contains the same data and may transmit acknowledgment frames to all the senders of data frames containing the same data.

Even if three or more wireless communication apparatuses on the data transmission side are provided, variation of the configurations and operations described in the first embodiment and the present embodiment can be performed similarly.

According to the present embodiment, the wireless communication apparatus 20 including the acknowledgment frame control unit 26 receives data frames containing the same data transmitted from the wireless communication apparatuses on the transmission side. If the wireless communication apparatus 20 has succeeded in the reception of at least one of the data frames, the wireless communication apparatus 20 transmits acknowledgment frames to not only the sender of the at least one of the data frames that has been successfully received, but also the senders of the other data frames containing the same data. That is, the wireless communication apparatus 20 notifies the wireless communication apparatuses, which have transmitted the same data, of the success of reception of the respective data frames.

The wireless communication apparatuses on the data transmission side receiving the acknowledgment frames do not redundantly retransmit the data frames containing the same data as the data already received by the wireless communication apparatus 20. Using the wireless communication channels regardless of unnecessity can be reduced, and a redundant time for which the wireless communication channels are occupied can be reduced while enhancing the reliability of wireless communication in the overall wireless communication system. In addition, since not only the wireless communication apparatuses on the data transmission side, but also the wireless communication apparatus 20 do not need to receive redundant data frames, the power consumed by the wireless communication system can be saved.

In a case where the wireless communication apparatus 20 transmits multiple Ack frames as acknowledgment frames, the occupied time of the wireless communication channels is made shorter by transmitting these Ack frames by multiplexing, and the reliability of wireless communication can be thereby increased while achieving lower delay and power saving. In addition, if the wireless communication apparatus 20 uses a Block Ack frame instead of the Ack frames to notify the wireless communication apparatuses on the data transmission side of the acknowledgment of data frames at once, the occupied time of the wireless communication channels is made shorter and, therefore, the power can be further saved in the overall wireless communication system, and a redundant occupied time of the wireless communication channels can be reduced while increasing the reliability of wireless communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   receiver circuitry configured to receive, from a data storage apparatus, a data frame comprising first data;
   transmitter circuitry configured to transmit, to a destination apparatus, a first data frame comprising the first data which is included in the received data frame, wherein the first data frame is transmitted to the destination apparatus by the electronic apparatus without passing through a first electronic apparatus, wherein the first electronic apparatus is an apparatus other than the data storage apparatus, the destination apparatus, and the present electronic apparatus; and
   processing circuitry,
   wherein:
   the receiver circuitry is configured to:
   receive first acknowledgment information from the destination apparatus, wherein the first acknowledgment information indicates whether the first data included in the first data frame is received successfully by the destination apparatus; and
   receive second acknowledgment information from the destination apparatus, wherein the second acknowledgment information indicates whether the first data included in a second data frame is received successfully by the destination apparatus, wherein the second data frame is different from the first data frame and is transmitted to the destination apparatus by the first electronic apparatus without passing through the electronic apparatus,
   the processing circuitry is configured to determine whether or not to retransmit the first data, based on at least one of the first acknowledgment information and the second acknowledgment information,
   the processing circuitry is configured to determine not to retransmit the first data to the destination apparatus, when (1) the first acknowledgment information is not received successfully by the receiver circuitry or the first acknowledgment information indicates that the first data in the first data frame is not received successfully by the destination apparatus, and (2) the second acknowledgment information indicates that the first data in the second data frame is received successfully by the destination apparatus, and
   the processing circuitry is configured to determine not to retransmit the first data to the destination apparatus, when the first acknowledgment information indicates that the first data in the first data frame is received successfully by the destination apparatus.

2. The electronic apparatus of claim 1, wherein the transmitter circuitry is configured to transmit the first data frame in parallel with the second data frame by multiplexing.

3. The electronic apparatus of claim 1, wherein the receiver circuitry is configured to receive an acknowledgment frame comprising the first acknowledgment information and the second acknowledgment information, the first acknowledgment information indicating whether the first data in the first data frame is received successfully or not by the destination apparatus, and the second acknowledgment information indicating whether the first data in the second data frame is received successfully or not by the destination apparatus.

4. The electronic apparatus of claim 1, wherein the electronic apparatus uses a wireless LAN.

5. An electronic apparatus comprising:
   receiver circuitry configured to:
   receive a first data frame comprising first data from a first sender apparatus, wherein the first data frame is sent from the first sender apparatus to the electronic apparatus without passing through a second sender apparatus; and
   receive a second data frame comprising the first data from the second sender apparatus, wherein the second data frame is sent from the second sender apparatus to the electronic apparatus without passing through the first sender apparatus, the second data frame being different from the first data frame, the second sender apparatus being different from the first sender apparatus;
an acknowledgment frame controller configured to:
issue an instruction to transmit acknowledgment information that indicates that the first data frame and the second data frame are successfully received by the electronic apparatus when the first data in the first data frame is received successfully by the receiver circuitry and the first data in the second data frame is not received successfully by the receiver circuitry;
issue the instruction when the first data in the first data frame is not received successfully by the receiver circuitry and the first data in the second data frame is received successfully by the receiver circuitry; and
issue the instruction when the first data in the first data frame is received successfully by the receiver circuitry and the first data in the second data frame is received successfully by the receiver circuitry; and
transmitter circuitry configured to transmit the acknowledgment information, which indicates the first data frame and the second data frame are successfully received by the electronic apparatus, to the first sender apparatus and the second sender apparatus in accordance with the instruction.

6. The electronic apparatus of claim 5, wherein
the transmitter circuitry is further configured to transmit a trigger frame that comprises information that the first sender apparatus and the second sender apparatus need for transmitting the first data frame and the second data frame, respectively.

7. The electronic apparatus of claim 5, wherein
if it is unknown whether the first data frame comprises the first data and it is unknown whether the second data frame comprises the first data, the receiver circuitry is further configured to:
determine that the first data frame comprises the first data based on at least one of a receiving time of the first data frame, an address of a sender apparatus, an AID, a sequence number, and a TID that are included in the first data frame; and
determine that the second data frame comprises the first data based on at least one of a receiving time of the second data frame, an address of a sender apparatus, an AID, a sequence number, and a TID that are included in the second data frame.

8. The electronic apparatus of claim 7, wherein
the acknowledgment frame controller is further configured to instruct, if the receiver circuitry does not determine that the first data frame comprises the first data, the transmitter circuitry to transmit acknowledgment information to a sender apparatus that transmitted a data frame which is successfully received.

9. The electronic apparatus of claim 5, wherein
the receiver circuitry is further configured to receive the first data frame and the second data frame that are transmitted in parallel by multiplexing.

10. The electronic apparatus of claim 5, wherein
the transmitter circuitry is further configured to transmit the acknowledgment information in parallel by multiplexing.

11. The electronic apparatus of claim 5, wherein
the electronic apparatus uses a wireless LAN.

12. A method comprising:
receiving, by receiver circuitry of an electronic apparatus, a data frame comprising first data from a data storage apparatus;
transmitting, by transmitter circuitry of the electronic apparatus, a first data frame comprising the first data, which is included in the received data frame, to a destination apparatus, wherein the first data frame is transmitted to the destination apparatus by the electronic apparatus without passing through a first electronic apparatus, wherein the first electronic apparatus is an apparatus other than the data storage apparatus, the destination apparatus, and the electronic apparatus;
receiving, by the receiver circuitry of the electronic apparatus, first acknowledgment information and second acknowledgment information from the destination apparatus, wherein the first acknowledgment information indicates whether the first data included in the first data frame is received successfully by the destination apparatus, the second acknowledgment information indicates whether the first data included in a second data frame, which is transmitted to the destination apparatus by the first electronic apparatus without passing through the electronic apparatus, is received successfully by the destination apparatus, wherein the second data frame is different from the first data frame; and
determining, by processing circuitry of the electronic apparatus, whether or not to retransmit the first data, based on at least one of the first acknowledgment information and the second acknowledgment information,
wherein the determining comprises:
determining not to retransmit the first data to the destination apparatus, when (1) the first acknowledgment information is not received successfully by the receiver circuitry or the first acknowledgment information indicates that the first data in the first data frame is not received successfully by the destination apparatus, and (2) the second acknowledgment information indicates that the first data in the second data frame is received successfully by the destination apparatus; and
determining not to retransmit the first data to the destination apparatus, when the first acknowledgment information indicates that the first data in the first data frame is received successfully by the destination apparatus.

13. A method comprising:
receiving, by receiver circuitry of an electronic apparatus, a first data frame comprising first data from a first sender apparatus, wherein the first data frame is sent from the first sender apparatus to the electronic apparatus without passing through a second sender apparatus, and receiving, by the receiver circuitry of the electronic apparatus, a second data frame comprising the first data from the second sender apparatus, wherein the second data frame is sent from the second sender apparatus to the electronic apparatus without passing through the first sender apparatus, the second data frame being different from the first data frame, the second sender apparatus being different from the first sender apparatus;
issuing, by a controller of the electronic apparatus, an instruction to transmit acknowledgment information that indicates that the first data frame and the second data frame are successfully received by the electronic apparatus when the receiving of the first data in the first data frame is successful and the receiving of the first data in the second data frame is not successful;
issuing, by the controller, the instruction when the receiving of the first data in the first data frame is not successful and the receiving of the first data in the second data frame is successful;

issuing, by the controller, the instruction when the receiving of the first data in the first data frame is successful and the receiving of the first data in the second data frame is successful; and transmitting, by transmitter circuitry of the electronic apparatus, the acknowledgment information, which indicates the first data frame and the second data frame are successfully received by the electronic apparatus, to the first sender apparatus and the second sender apparatus in accordance with the instruction.

14. The electronic apparatus of claim 5, wherein
in the first sender apparatus and the second sender apparatus, it is determined that the first data is not to be retransmitted to the electronic apparatus in accordance with the transmitted acknowledge information.

15. The electronic apparatus of claim 1, wherein:
the receiver circuitry is configured to:
receive the first acknowledgment information from the destination apparatus without the first acknowledgement information passing through the first electronic apparatus; and
receive the second acknowledgment information from the destination apparatus without the second acknowledgment passing through the first electronic apparatus.

16. The electronic apparatus of claim 5, wherein:
the transmitter circuitry is configured to:
transmit the acknowledgment information to the first sender apparatus without the acknowledgement information passing through the second sender apparatus; and
transmit the acknowledgment information to the second sender apparatus without the acknowledgement information passing through the first sender apparatus.

17. The method of claim 12, wherein:
the receiving the first acknowledgment information and the second acknowledgment information comprises:
receiving the first acknowledgment information from the destination apparatus without the first acknowledgment information passing through the first electronic apparatus; and
receiving the second acknowledgment information from the destination apparatus without the second acknowledgment information passing through the first electronic apparatus.

18. The method of claim 13, wherein:
the transmitting the acknowledgment information comprises:
transmitting the acknowledgment information to the first sender apparatus without the acknowledgment information passing through the second sender apparatus; and
transmitting the acknowledgment information to the second sender apparatus without the acknowledgment information passing through the first sender apparatus.

19. The method of claim 13, further comprising:
determining that the receiving of the first data in the first data frame is successful and the receiving of the first data in the second data frame is not successful;
after said determining, issuing, by the controller, the instruction; and
transmitting, by the transmitter circuitry, the acknowledgment information, which indicates the first data frame and the second data frame are successfully received by the electronic apparatus, to the first sender apparatus and the second sender apparatus in accordance with the instruction.

20. The method of claim 13, further comprising:
determining that the receiving of the first data in the first data frame is not successful and the receiving of the first data in the second data frame is successful;
after said determining, issuing, by the controller, the instruction; and
transmitting, by the transmitter circuitry, the acknowledgment information, which indicates the first data frame and the second data frame are successfully received by the electronic apparatus, to the first sender apparatus and the second sender apparatus in accordance with the instruction.

21. The method of claim 13, further comprising:
determining that the receiving of the first data in the first data frame is successful and the receiving of the first data in the second data frame is successful;
after said determining, issuing, by the controller, the instruction; and
transmitting, by the transmitter circuitry, the acknowledgment information, which indicates the first data frame and the second data frame are successfully received by the electronic apparatus, to the first sender apparatus and the second sender apparatus in accordance with the instruction.

* * * * *